US009897931B2

(12) United States Patent
Nishioka et al.

(10) Patent No.: US 9,897,931 B2
(45) Date of Patent: Feb. 20, 2018

(54) ELECTROCONDUCTIVE MEMBER FOR ELECTROPHOTOGRAPHY, PROCESS CARTRIDGE, AND ELECTROPHOTOGRAPHIC IMAGE-FORMING APPARATUS

(71) Applicant: CANON KABUSHIKI KAISHA, Tokyo (JP)

(72) Inventors: Satoru Nishioka, Suntou-gun (JP); Kazuhiro Yamauchi, Suntou-gun (JP); Kenichi Yamauchi, Mishima (JP); Hiroki Masu, Tokyo (JP); Noriko Suzumura, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 14/943,774

(22) Filed: Nov. 17, 2015

(65) Prior Publication Data

US 2016/0154323 A1 Jun. 2, 2016

(30) Foreign Application Priority Data

Nov. 28, 2014 (JP) ................................ 2014-242470

(51) Int. Cl.
*B05C 1/08* (2006.01)
*B32B 5/16* (2006.01)
(Continued)

(52) U.S. Cl.
CPC ........... *G03G 5/04* (2013.01); *G03G 15/0233* (2013.01); *G03G 15/0818* (2013.01); *G03G 15/1685* (2013.01)

(58) Field of Classification Search
CPC ............... G03G 15/0233; G03G 15/04; G03G 15/0818; G03G 15/1685
(Continued)

(56) References Cited

U.S. PATENT DOCUMENTS 5,278,614 A 1/1994 Ikegawa et al.
5,914,386 A * 6/1999 Berendse ........... C08G 18/4286 525/176
(Continued)

FOREIGN PATENT DOCUMENTS

CN 1261446 A 7/2000
CN 104115073 A 10/2014
(Continued)

OTHER PUBLICATIONS

Viasu, et al., U.S. Appl. No. 14/956,862, filed Dec. 2, 2015.
(Continued)

*Primary Examiner* — Thao T Tran
(74) *Attorney, Agent, or Firm* — Fitzpatrick Cella Harper and Scinto

(57) ABSTRACT

Provided is an electroconductive member for electrophotography having a stable charging ability. The electroconductive member includes, in this order, an electroconductive substrate, an electroconductive elastic layer, and a surface layer. The surface layer contains a polymer having a urethane linkage. The polymer has, in the molecule, structures included in at least two groups selected from: Group A of structures each represented by a specific structural formula (1); Group B of at least one of structures each represented by a specific structural formula (2) or structures each represented by a structural formula (3); and Group C of structures each represented by a specific structural formula (4). The surface layer has a volume resistivity of $1.0\times10^{10}$ Ω·cm or more and $1.0\times10^{16}$ Ω·cm or less, and the surface layer has a universal hardness at a depth 1 μm from the surface thereof of 1.0 $N/mm^2$ or more and 7.0 $N/mm^2$ or less.

6 Claims, 1 Drawing Sheet

(51) Int. Cl.

| | |
|---|---|
| ***G03G 5/04*** | (2006.01) |
| ***G03G 15/02*** | (2006.01) |
| ***G03G 15/08*** | (2006.01) |
| ***G03G 15/16*** | (2006.01) |

(58) Field of Classification Search
USPC .................................................. 399/111, 116
See application file for complete search history.

(56) References Cited

U.S. PATENT DOCUMENTS

| | | | | |
|---|---|---|---|---|
| 6,360,069 | B1 * | 3/2002 | Mimura | F16C 13/00 399/286 |
| 8,503,911 | B2 | 8/2013 | Suzumura et al. | |
| 8,526,857 | B2 | 9/2013 | Tomomizu et al. | |
| 8,706,011 | B2 | 4/2014 | Anan et al. | |
| 9,086,643 | B2 | 7/2015 | Kikuchi et al. | |
| 2007/0269240 | A1 | 11/2007 | Uchino et al. | |
| 2008/0220363 | A1 | 9/2008 | Uchino et al. | |
| 2010/0158564 | A1 * | 6/2010 | Nakamura | G03G 15/0818 399/111 |
| 2013/0004206 | A1 | 1/2013 | Kuroda et al. | |
| 2013/0034369 | A1 | 2/2013 | Masu et al. | |
| 2013/0064571 | A1 | 3/2013 | Kodama et al. | |
| 2013/0287454 | A1 | 10/2013 | Anan et al. | |
| 2014/0004258 | A1 | 1/2014 | Suzumura et al. | |
| 2014/0072343 | A1 | 3/2014 | Masu et al. | |
| 2014/0080691 | A1 | 3/2014 | Kurachi et al. | |
| 2014/0093278 | A1 | 4/2014 | Yamada et al. | |
| 2015/0331348 | A1 | 11/2015 | Doi et al. | |

FOREIGN PATENT DOCUMENTS

| | | | |
|---|---|---|---|
| EP | 1239339 | A1 | 9/2002 |
| EP | 1239339 | A1 | 11/2002 |
| JP | 5-323762 | A | 12/1993 |
| JP | 2010-72405 | A | 4/2010 |
| WO | 2014002429 | A1 | 1/2014 |

OTHER PUBLICATIONS

Yamauchi et al., U.S. Appl. No. 14/945,297, filed Nov. 18, 2015.
Viasu, et al., U.S. Appl. No. 14/946,768, filed Nov. 19, 2015.
Yamauchi et al., U.S. Appl. No. 14/945,314, filed Nov. 18, 2015.

* cited by examiner

ELECTROCONDUCTIVE MEMBER FOR ELECTROPHOTOGRAPHY, PROCESS CARTRIDGE, AND ELECTROPHOTOGRAPHIC IMAGE-FORMING APPARATUS

BACKGROUND OF THE INVENTION

Field of the Invention

The present invention relates to an electroconductive member, a process cartridge, and an electrophotographic image-forming apparatus.

Description of the Related Art

In an electrophotographic image-forming apparatus, electroconductive members for electrophotography, such as a charging member, a developing member, and a transferring member, are used.

In the case of a charging roller, the charging member is required to have an ability to uniformly charge a body to be charged, such as a photosensitive member.

In recent years, there have been demands for an additional improvement in image quality of an electrophotographic image, and a higher process speed and higher durability of the electrophotographic image-forming apparatus. Consequently, charging unevenness of the photosensitive member even at a level at which no problem has occurred heretofore may cause an image defect.

In particular, in recent years, a proposal of adopting a cleaner-less system (toner recycling system) in the electrophotographic image-forming apparatus has been made from the viewpoints of simplifying an image-forming apparatus and eliminating waste.

In this system, a drum cleaner serving as a cleaning unit after a transferring step is eliminated, and transfer residual toner on the photosensitive member after transfer is cleaned out by a developing apparatus simultaneously with development, to thereby remove the transfer residual toner from the photosensitive member and cause the developing apparatus to recover the transfer residual toner.

The method involving cleaning out the transfer residual toner on the photosensitive member simultaneously with development is a method involving recovering the transfer residual toner on the photosensitive member during development of an electrostatic latent image on the photosensitive member before proceeding to the next step of forming an electrophotographic image, through the use of a fog-removing bias, that is, a fog-removing voltage difference (Vback) which is a potential difference between a DC voltage to be applied to the developing apparatus and a surface potential of an image-bearing member.

In this connection, when a charging member of a contact charging system is applied to the cleaner-less system, adhesion of contamination to a surface of the charging member becomes more remarkable in some cases. In order to solve such problem, there is a proposal of a system in which a circumferential speed difference is provided between the charging member and the photosensitive member and the transfer residual toner is triboelectrically charged by the charging member, with the result that it is electrostatically difficult for the transfer residual toner to migrate to the surface of the charging member. However, the provision of the circumferential speed difference between the charging member and the photosensitive member may increase injection charging of the photosensitive member by the charging member, with the result that charging unevenness may be liable to occur on the photosensitive member.

In this regard, in order to reduce the injection charging of the photosensitive member by the charging member, in Japanese Patent Application Laid-Open No. 2010-72405, there is a proposal of adding a hydrophobic surfactant into a surface layer of a charging roller.

In addition, in Japanese Patent Application Laid-Open No. H05-323762, there is a proposal of a charging sheet formed of two layers, specifically, an insulating layer and an electroconductive layer.

According to investigations made by the inventors of the present invention, when the hydrophobic surfactant is added to the surface layer of the charging roller as in Japanese Patent Application Laid-Open No. 2010-72405, an effect is obtained on the injection charging of the photosensitive member at an initial stage of image output, but the injection charging-suppressing effect disappears along with an increase in number of sheets subjected to image output. The reason for this is considered to be as described below. The hydrophobic surfactant is oriented to the outermost surface of the surface layer of the charging roller to suppress the injection charging. However, along with the increase in number of sheets subjected to image output, the hydrophobic surfactant at the outermost surface of the surface layer of the charging roller may migrate to the photosensitive member in contact therewith, or the hydrophobic surfactant may be decomposed by a discharge, resulting in the disappearance of the injection charging-suppressing effect. In addition, owing to a small amount of the hydrophobic surfactant added to the surface layer of the charging roller, a binder of the surface layer significantly affects the injection charging of the photosensitive member, and hence binders which may be used for the surface layer are limited.

In addition, according to investigations made by the inventors of the present invention, when the charging sheet of Japanese Patent Application Laid-Open No. H05-323762 is used, the injection charging of the photosensitive member can be suppressed. However, a fine gap region in which a discharge occurs, the region being formed by the charging sheet and the photosensitive member brought into contact with each other, is liable to change owing to film thickness unevenness of the photosensitive member or powder of, for example, an external additive or toner remaining on the photosensitive member. Accordingly, when the fine gap region changes, the discharge region changes, resulting in change in ease of potential transfer. As a result, the photosensitive member is liable to have potential unevenness owing to discharge unevenness.

In view of the foregoing, the present invention is directed to providing an electroconductive member for electrophotography capable of more uniformly charging a body to be charged. The present invention is also directed to providing a process cartridge and an electrophotographic image-forming apparatus which are capable of stably forming high-quality electrophotographic images over a long period of time.

SUMMARY OF THE INVENTION

The inventors of the present invention have made extensive investigations in order to achieve the above-mentioned objects. As a result, the inventors have found that the above-mentioned objects can be achieved by incorporating a polyurethane resin which contains specific structures and is controlled to have a specific volume resistivity into a surface layer of an electroconductive member, and optimizing the hardness of the surface layer.

According to one embodiment of the present invention, there is provided an electroconductive member for electrophotography, including, in this order:

an electroconductive substrate;

an electroconductive elastic layer; and a surface layer, in which the surface layer has a volume resistivity of $1.0\times10^{10}$ Ω·cm or more and $1.0\times10^{16}$ Ω·cm or less, has a universal hardness at a depth of 1 μm from a surface thereof of 1.0 $N/mm^2$ or more and 7.0 $N/mm^2$ or less, and contains a polymer having a urethane linkage, the polymer having, in a molecule, structures of at least two groups selected from the following three groups of structures (A), (B), and (C):

(A) a structure represented by the following structural formula (1);

(B) at least one structure selected from a group consisting of a structure represented by the following structural formula (2) and a structure represented by the following structural formula (3); and (C) a structure represented by the following structural formula (4):

in which the charging member is the electroconductive member for electrophotography.

According to still another embodiment of the present invention, there is provided an electrophotographic image-forming apparatus, including:

an electrophotographic photosensitive member; and a charging member arranged in contact with the electrophotographic photosensitive member, in which the charging member is the electroconductive member for electrophotography.

Further features of the present invention will become apparent from the following description of exemplary embodiments with reference to the attached drawings.

Structural formula (1)

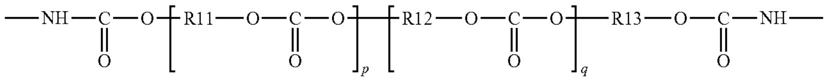

Structural formula (2)

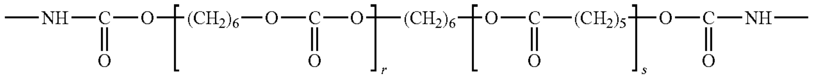

Structural formula (3)

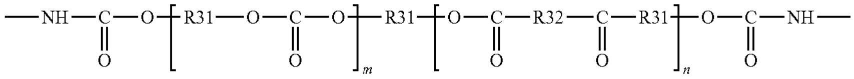

Structural formula (4)

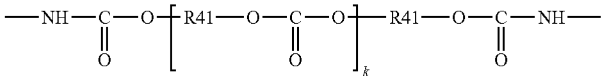

Figure 1:
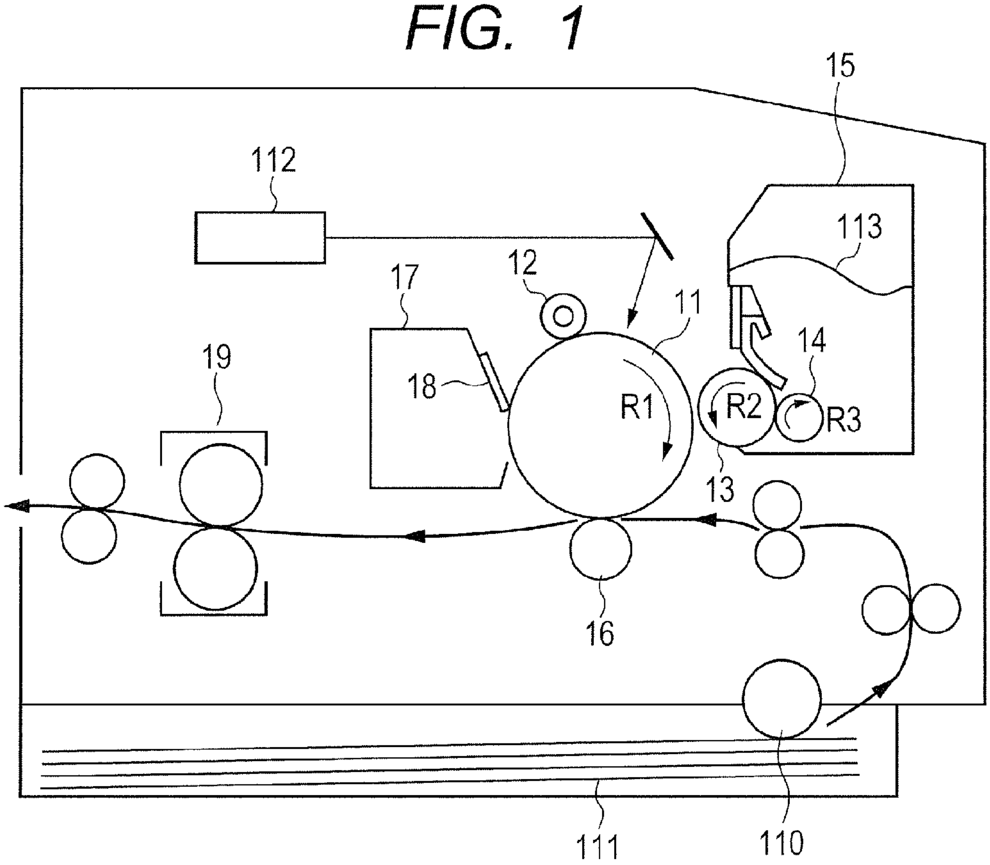
FIG. 1 is an explanatory view of an electrophotographic image-forming apparatus according to the present invention.

where:

in the structural formula (1), R11, R12, and R13 each represent a divalent hydrocarbon group having 3 or more and or less carbon atoms, provided that R11 and R12 are different from each other and R13 is identical to one of R11 and R12, and p and q each independently represent a number of 1.0 or more;

in the structural formula (2), r and s each independently represent a number of 1.0 or more;

in the structural formula (3), R31 and R32 each independently represent a divalent hydrocarbon group having 3 or more and 8 or less carbon atoms, and m and n each independently represent a number of 1.0 or more; and in the structural formula (4), R41 represents a divalent hydrocarbon group having 6 or more and 9 or less carbon atoms, and k represents a number of 1.0 or more.

According to another embodiment of the present invention, there is provided a process cartridge, including:

an electrophotographic photosensitive member; and a charging member arranged in contact with the electrophotographic photosensitive member, the process cartridge being removably mounted onto a main body of an electrophotographic image-forming apparatus,

DESCRIPTION OF THE EMBODIMENTS

Preferred embodiments of the present invention will now be described in detail in accordance with the accompanying drawings.

Figure 2:
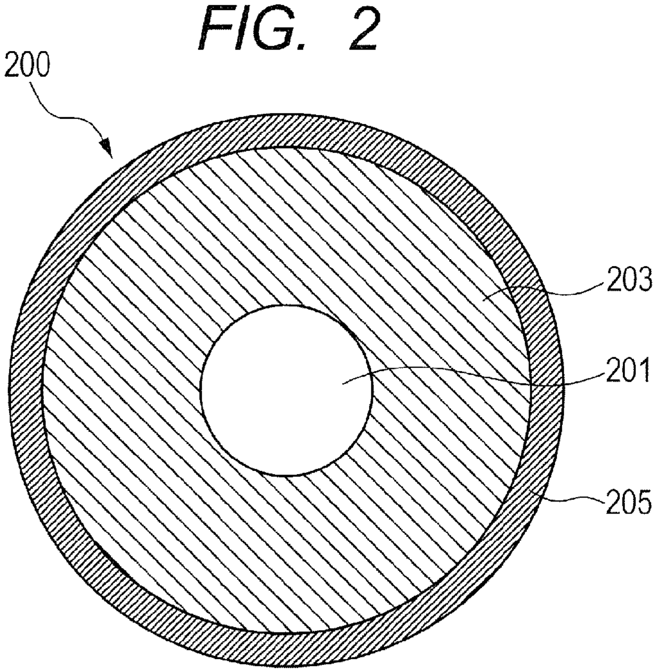
FIG. 2 is a cross-sectional view of an electroconductive member for electrophotography having a roller shape according to the present invention.

FIG. 2 is a schematic cross-sectional view of an electroconductive member for electrophotography having a roller shape (hereinafter sometimes referred to as "electroconductive roller") according to the present invention in a direction perpendicular to its circumferential direction.

An electroconductive roller 200 illustrated in FIG. 2 includes an electroconductive substrate 201, an electroconductive elastic layer 203, and a surface layer 205 in the stated order.

In addition, the surface layer contains a polymer having a urethane linkage.

The polymer has, in a molecule, structures of at least two groups selected from the following three groups of structures (A), (B), and (C):

(A) a structure represented by the following structural formula (1);

(B) at least one structure selected from a group consisting of a structure represented by the structural formula (2) and a structure represented by the structural formula (3); and (C) a structure represented by the structural formula (4):

Structural formula (1)

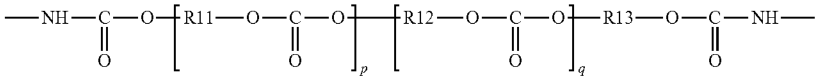

Structural formula (2)

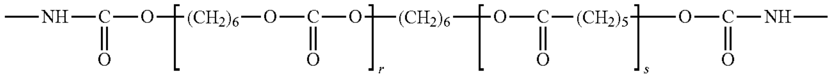

Structural formula (3)

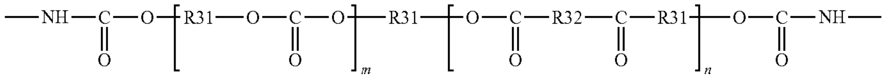

Structural formula (4)

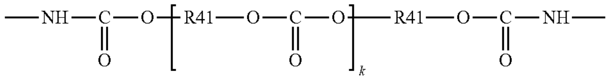

where:

in the structural formula (1), R11, R12, and R13 each represent a divalent hydrocarbon group having 3 or more and or less carbon atoms, provided that R11 and R12 are different from each other and R13 is identical to one of R11 and R12, and p and q each independently represent a number of 1.0 or more;

in the structural formula (2), r and s each independently represent a number of 1.0 or more;

in the structural formula (3), R31 and R32 each independently represent a divalent hydrocarbon group having 3 or more and 8 or less carbon atoms, and m and n each independently represent a number of 1.0 or more; and in the structural formula (4), R41 represents a divalent hydrocarbon group having 6 or more and 9 or less carbon atoms, and k represents a number of 1.0 or more.

In addition, the surface layer has a volume resistivity of $1.0\times10^{10}$ Ω·cm or more and $1.0\times10^{16}$ Ω·cm or less. Further, the surface layer has a "universal hardness (t=1 μm position)" at a depth of 1 μm from a surface thereof of 1.0 $N/mm^2$ or more and 7.0 $N/mm^2$ or less.

The inventors of the present invention have found that when the construction and characteristics of the surface layer of the electroconductive member satisfy the above-mentioned conditions, the electroconductive member can uniformly charge a photosensitive member irrespective of a use environment or the number of sheets subjected to image output.

The inventors of the present invention presume the reason why the above-mentioned construction provides the effect of interest to be as described below.

In order to uniformly charge a body to be charged, such as a photosensitive member, it is preferred to suppress the injection of a charge from a charging member to the body to be charged.

In general, the injection of a charge is remarkable under a high-temperature and high-humidity (e.g., temperature: 30° C., relative humidity: 80%) environment (hereinafter sometimes referred to as "HH environment"). This is probably because a binder resin in the surface layer of a charging roller absorbs moisture in the HH environment and the moisture absorbed into the surface layer or a low-molecular-weight compound contained as an impurity in the surface layer behaves like an ion conductive agent to promote injection charging of the photosensitive member. Therefore, it is considered that the use of an insulating material having low ion conductivity as the binder resin in the surface layer can suppress a change in injection charging depending on a use environment.

A urethane resin is often used as the binder resin in the surface layer of the charging member from the viewpoints of, for example, wear resistance and moldability. The urethane resin is broadly classified into a polyether-based urethane resin and a polyester-based urethane resin, and each of the resins contains a large amount of polar functional groups, and hence has a low volume resistivity in many cases. In order to ameliorate this problem, an insulating urethane resin may be obtained by using an aromatic polyester polyol, or using a polyfunctional polyol to increase a crosslinking degree. However, when such urethane resin is used as the binder resin in the surface layer of the charging roller, its high hardness may cause a flaw in the surface of the photosensitive member. As a result, as the number of sheets subjected to image output increases, the photosensitive member may be flawed in its circumferential direction, resulting in an image defect, or the photosensitive member may be worn at an abutment position with an end portion of the charging roller at which the abutting pressure is high, resulting in charge leakage. In addition, when the urethane resin having a high crosslinking degree is used as the binder resin in the surface layer, the elastic layer may fail to follow shrinkage at the time of curing of the surface layer, resulting in a crack. Under such situation, it has been revealed that that when a urethane resin for the binder in the surface layer is produced using a polycarbonate polyol, the surface layer can achieve both an insulating property needed to suppress injection charging and flexibility for preventing the photosensitive member from being flawed. However, it has been confirmed that when a circumferential speed difference is provided between the photosensitive member and the charging roller as a measure against toner contamination in the use of a cleaner-less system, the surface layer of the charging roller is worn to increase injection charging as the number of sheets subjected to image formation increases.

The urethane resin is formed of a soft segment formed of a sea of a flexible polyol component and a hard segmentcrystallized through aggregation caused by hydrogen bonding of a urethane linkage moiety.

In view of the foregoing, from the viewpoint of improving the wear resistance of the surface layer, the inventors of the present invention have considered that the wear resistance may be improved while the flexibility and volume resistivity of the surface layer are maintained, by appropriately enhancing an aggregation force in the soft segment in the urethane resin. In this regard, the inventors have made investigations on the introduction of a functional group which has appropriate crystallinity and/or appropriately improves aggregation energy into the soft segment of the urethane resin. As a result, the inventors have found that when a polymer having, in the molecule, structures of at least two groups selected from the following three groups is allowed to be present in the surface layer, an electroconductive member whose surface layer is flexible and less liable to be worn, and which can suppress injection charging of the photosensitive member is obtained: Group A of structures represented by the structural formula (1), Group B of structures represented by the following structural formula (2) and/or structures represented by the structural formula (3), and Group C of structures represented by the following structural formula (4).

Now, the present invention is described in detail.

<Electroconductive Member for Electrophotography>

A schematic cross-sectional view of the electroconductive member for electrophotography having a roller shape (hereinafter sometimes referred to as "electroconductive roller") according to the present invention in a direction perpendicular to its circumferential direction is illustrated in FIG. 2.

The electroconductive member 200 for electrophotography according to FIG. 2 includes at least the electroconductive substrate 201, the electroconductive elastic layer 203 formed on the substrate, and the surface layer 205 formed on the electroconductive elastic layer.

Layers to be formed on the electroconductive substrate may have a three-layer structure (not shown) in which an intermediate layer is arranged between the elastic layer and the surface layer, or a multi-layer structure (not shown) in which a plurality of intermediate layers are arranged, as well as the two-layer structure of the elastic layer and the surface layer illustrated in FIG. 2.

The electroconductive member for electrophotography may be used as a member to be mounted onto an electrophotographic image-forming apparatus (electrophotographic apparatus) adopting an electrophotographic process (electrophotographic system), such as a copying machine or a laser printer. Specifically, the electroconductive member for electrophotography may be used as a charging member, a developing member, a transferring member, a charge-eliminating member, or a conveying member such as a sheet-feeding roller. Now, the present invention is described in detail by taking a charging member having a roller shape (hereinafter sometimes referred to as "charging roller") as a specific example of the member for electrophotography according to the present invention, but the present invention is not limited thereto.

[Surface Layer]

The surface layer contains a polymer having a urethane linkage. In addition, the polymer has structures of at least two groups selected from the following three groups of structures (A), (B), and (C):

(A) a structure represented by the following structural formula (1);

(B) at least one structure selected from a group consisting of a structure represented by the following structural formula (2) and a structure represented by the following structural formula (3); and (C) a structure represented by the following structural formula (4):

Structural formula (1)

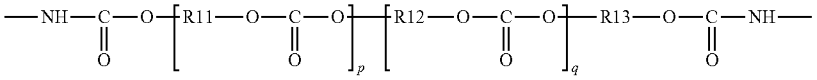

Structural formula (2)

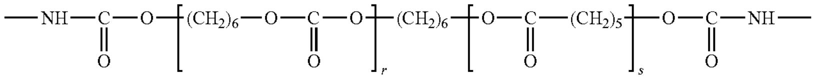

Structural formula (3)

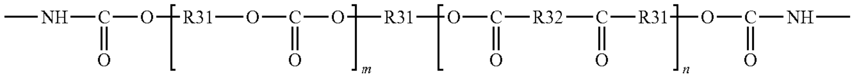

Structural formula (4)

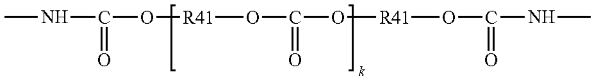

where:

in the structural formula (1), R11, R12, and R13 each represent a divalent hydrocarbon group having 3 or more and or less carbon atoms, provided that R11 and R12 are different from each other and R13 is identical to one of R11 and R12, and p and q each independently represent a number of 1.0 or more;

in the structural formula (2), r and s each independently represent a number of 1 or more;

in the structural formula (3), R31 and R32 each independently represent a divalent hydrocarbon group having 3 or more and 8 or less carbon atoms, and m and n each independently represent a number of 1.0 or more; and in the structural formula (4), R41 represents a divalent hydrocarbon group having 6 or more and 9 or less carbon atoms, and k represents a number of 1.0 or more.

Each structure represented by the structural formula (1) is a structure obtained by subjecting a copolymerized polycarbonate polyol having its crystallinity suppressed by bonding two carbonate groups with two different kinds of hydrocarbon groups to a reaction with an isocyanate. By virtue of the suppressed crystallinity, aggregation energy in the soft segment is low, and flexibility and a high volume resistivity can be imparted to the surface layer. However, when the structural formula (1) is used alone in the surface layer, the aggregation energy in the soft segment is weak, and hence it is difficult to impart wear resistance to the surface layer. In addition, the tackiness of the surface layer is enhanced to increase the adhesion of toner, powder, or the like to the surface of the surface layer, and the electrical resistance value of the surface of the surface layer is increased by the contamination, with the result that it is difficult to uniformly charge the photosensitive member.

In the structural formula (1), R11 and R12 each independently represent a divalent hydrocarbon group having 3 or more and 9 or less carbon atoms. R11 and R12 are different from each other, and R13 is identical to one of R11 and R12. When the number of carbon atoms of each of R11 and R12 is 3 or more, in the polymer having a urethane linkage, the amount of carbonate groups each of which is a polar functional group and has strong aggregation energy does not become excessively large, and the surface layer can keep flexibility and a high electrical resistance value.

In addition, when the number of carbon atoms of each of R11 and R12 is 9 or less, the amount of carbonate groups in the polymer having a urethane linkage does not become excessively small, and the strength of the polymer can be increased. In addition, when R11 and R12 have different structures, the crystallinity of the polymer can be suppressed, flexibility can be imparted to the surface layer, and its low-temperature characteristics can be improved. p and q each independently represent a number of 1.0 or more.

The structures represented by the structural formula (2) and the structural formula (3) are each a structure obtained by subjecting a copolymerized polyol having copolymerized therein a polycarbonate structure and a polyester structure to a reaction with an isocyanate. The copolymerization of the polycarbonate structure and the polyester structure suppresses the crystallinity of the polymer, and the introduction of an ester group having stronger aggregation energy than a carbonate group appropriately reinforces the soft segment, and hence wear resistance can be imparted to the surface layer. However, when the surface layer is formed using a polymer having none of the structures represented by the structural formula (1) and the structural formula (4) and having only a structure represented by the structural formula (2) and/or the structural formula (3), a sufficient volume resistivity cannot be imparted to the surface layer owing to the polarity of the ester group, and hence it is difficult to suppress injection charging of the photosensitive member.

In the structural formula (2), r and s each independently represent a number of 1.0 or more.

In the structural formula (3), R31 and R32 each independently represent a divalent hydrocarbon group having 3 or more and 8 or less carbon atoms, and m and n each independently represent a number of 1 or more. When the number of carbon atoms of each of R31 and R32 is 3 or more, in the polymer having a urethane linkage, the amounts of carbonate groups and ester groups each of which is a polar functional group and has strong aggregation energy do not become excessively large, and the surface layer can keep flexibility. In addition, when the number of carbon atoms of each of R31 and R32 is 8 or less, the amounts of carbonate groups and ester groups in the polymer having a urethane linkage do not become excessively small, and wear resistance can be imparted to the surface layer.

Each structure represented by the structural formula (4) is a structure obtained by subjecting a polycarbonate polyol having high crystallinity in which carbonate groups are bonded through a single hydrocarbon group to a reaction with an isocyanate. This structure has high crystallinity and is easily aligned in the soft segment, and hence can impart wear resistance and a high volume resistivity to the surface layer. However, when the surface layer is formed using a polymer having none of the structures represented by the structural formulae (1), (2), and (3) and having only a structure represented by the structural formula (4), the surface layer is liable to have a high hardness and its low-temperature characteristics are deteriorated.

In the structural formula (4), R41 represents a divalent hydrocarbon group having 6 or more and 9 or less carbon atoms, and k represents an integer of 1 or more. When the number of carbon atoms of R41 is 6 or more, crystallinity is easily expressed, and wear resistance and a high volume resistivity can be imparted to the surface layer. When the number of carbon atoms of R41 is 9 or less, excessive crystallinity is suppressed, and hence an increase in hardness of the surface layer can be suppressed by further incorporating at least one of the structures represented by the structural formulae (1), (2), and (3) into the polymer.

The surface layer contains the polymer having a urethane linkage, that is, a urethane resin as a binder resin, and the polymer has, in the molecule, structures included in at least two groups selected from the three groups consisting of Group (A), Group (B), and Group (C) described above. Thus, the surface layer is flexible and less liable to be worn, and can suppress injection charging of the photosensitive member.

When a polymer having, in the molecule, a structure of Group (A) and a structure of Group (B) is used, a balance among the flexibility and wear resistance of the surface layer, and the suppression of injection charging of the photosensitive member is good. Accordingly, such polymer is preferred. That is, a preferred polymer having a urethane linkage to be contained in the surface layer is a polymer having a structure represented by the structural formula (1), and at least one of the structures represented by the structural formulae (2) and (3). The polymer is more preferably a polymer having, in the molecule, a structure of Group (A), and a structure represented by the structural formula (2) among the structures included in Group (B), that is, a polymer having a structure represented by the structural formula (1) and a structure represented by the structural formula (2).

The reason for the foregoing is as described below. Each structure of Group (B) has copolymerized therein an ester structure, and hence hydrolysis of the polymer may proceed under high temperature and high humidity.

As compared to a polyester diol obtained by polycondensing a diol and a dicarboxylic acid, a polycaprolactone diol obtained by subjecting ϵ-caprolactone to ring-opening polymerization is excellent in hydrolysis resistance. Accordingly, a polymer whose copolymerized ester component contains a caprolactone-derived structure represented by the structural formula (2) is excellent in hydrolysis resistance as compared to a polymer containing a structure represented by the structural formula (3).

The fact that the polymer contained in the surface layer of the electroconductive member for electrophotography according to the present invention has at least two kinds of structures selected from the group consisting of the structures represented by the structural formulae (1), (2), (3), and (4) may be confirmed by, for example, analysis based on pyrolysis GC/MS, FT-IR, or NMR.

[Volume Resistivity]

The volume resistivity of the surface layer is $1.0\times10^{10}$ Ω·cm or more and $1.0\times10^{16}$ Ω·cm or less.

It is considered that an injection charge amount from the surface layer of the electroconductive member to the photosensitive member increases under a HH environment, and hence moisture in the surface layer or a low-molecular-weight compound contained as an impurity in the surface layer behaves like an ion conductive agent to promote injection charging. Accordingly, the injection charging is suppressed by reducing the ion conductivity of the surface layer, that is, by increasing the insulating property. Even under a situation in which the photosensitive member is charged under a HH environment by a process involving providing a circumferential speed difference between the charging roller and the photosensitive member, which is a situation in which the injection charging is most liable to occur, when the volume resistivity of the polymer forming the surface layer is $1.0\times10^{10}$ Ω·cm or more and $1.0\times10^{16}$ Ω·cm or less, an image defect due to potential unevenness of the photosensitive member is prevented from occurring. It should be noted that a target injection charge amount for maintaining output at a stable image density is 50 V or less.

With regard to the measurement of the volume resistivity of the surface layer, a measurement value measured using an atomic force microscope (AFM) in an electroconductive mode may be adopted. A sheet is cut out of the surface layer of the charging roller using a manipulator, and a metal is deposited from the vapor onto one surface of the surface layer. The surface onto which the metal has been deposited from the vapor is connected to a DC power source, and a voltage is applied. The free end of a cantilever is brought into contact with the other surface of the surface layer, and a current image is obtained through the main body of AFM. Current values at randomly selected 100 sites in the surface are measured, and the volume resistivity may be calculated based on the average current value of the 10 lowest current values measured, an average film thickness, and the contact area of the cantilever.

It should be noted that in order to adjust the volume resistivity of the surface layer to fall within the above-mentioned numerical range, specifically, the volume resistivity can be obtained by using of the urethane having the polycarbonate structure as a binder resin in the surface layer. It is more preferably that the surface layer contains the urethane resin as a binder resin, and the polymer has, in the molecule, structures included in at least two groups selected from the three groups consisting of Group (A), Group (B), and Group (C) described above. As the result, Under such situation, it has been revealed that that when a urethane resin for the binder in the surface layer is produced using a polycarbonate polyol, the surface layer can achieve both an insulating property needed to suppress injection charging and flexibility for preventing the photosensitive member from being flawed. Under such situation, the surface layer can achieve both a high volume resistivity needed to suppress injection charging and flexibility for preventing the photosensitive member from being flawed.

[Universal Hardness]

The universal hardness of the surface layer of the electroconductive member for electrophotography according to the present invention at a depth of 1 μm from the surface thereof is set to 1.0 N/mm$^2$ or more and 7.0 N/mm$^2$ or less. The universal hardness is measured when an indenter brought into abutment with the surface of the surface layer is driven at a speed of 1 μm per second and the indenter is driven to a depth of 1 μm from the surface. It should be noted that the universal hardness is herein sometimes referred to as "universal hardness (t=1 μm position)." When the universal hardness is set to fall within the above-mentioned numerical range, even an increase in number of sheets subjected to image formation hardly causes the photosensitive member to be flawed or worn, and hardly causes an image defect or charge leakage at an end portion of the charging roller.

The universal hardness may be measured using, for example, a universal hardness tester (trade name: ultra-micro hardness tester (trade name: HM-2000, manufactured by Fischer Instruments K.K.). The universal hardness is a physical property value determined by driving an indenter into a measurement object under the application of a load thereto, and is determined as "(test load)/(surface area of indenter under test load) (N/mm$^2$)." An indenter having the shape of a square pyramid or the like is driven into an object to be measured under the application of a predetermined relatively small test load, and when the indenter reaches a predetermined indentation depth, the surface area of the indenter brought into contact with the surface layer is determined based on the indentation depth, followed by the determination of the universal hardness from the above-mentioned expression.

In addition, in order to adjust the universal hardness of the surface layer to fall within the above-mentioned numerical range, specifically, the desired universal hardness can be obtained by softening treatment of the urethane resin as a binder resin in the surface layer.

As a method to soften the urethane resin, there is given selection of a molecular structure and/or a proper molecular weight of the polyol compound as a raw material of the urethane resin and the ratio of the number of isocyanate groups to the number of hydroxy groups. The polyol compound having a preferable structure is a blend of the polyol compound as a raw material of the polymer having a urethane linkage relating to the present invention (mentioned later) which can provide a flexibility to the resulting urethane resin. The proper molecular weight of the polyol compound is preferably 900 to 3000. When the molecular weight of the polyol compound is set to fall within the above-mentioned numerical range, the polyol compound has an excellent reactivity and with a polyisocyanate compound and an obtained urethane resin has a proper hardness. The ratio of the number of isocyanate groups to the number of hydroxy groups is preferably 1.0 to 2.0.

[Production of Polymer Having Urethane Linkage]

The polymer having a urethane linkage according to the present invention may be produced using (A) a polyol compound and (B) a polyisocyanate compound. A method as described in the following (1) or (2) is generally used for the synthesis of polyurethane:

(1) a one-shot method involving mixing a polyol component and a polyisocyanate component and subjecting the mixture to a reaction; or (2) a method involving subjecting an isocyanate group-terminated prepolymer, which is obtained through a reaction of part of polyols and an isocyanate, to react with a chain extender, such as a low-molecular-weight diol or a low-molecular-weight triol.

In the present invention, a method involving subjecting a hydroxy group-terminated prepolymer, which is obtained through a reaction of a raw material polyol and isocyanate, and an isocyanate group-terminated prepolymer, which is obtained through a reaction of a raw material polyol and isocyanate, to a heat curing reaction is preferred. When the amount of, for example, hydroxy groups or isocyanate groups, or urea linkages, allophanate linkages, or isocyanurate linkages is large, a large amount of polar functional groups is present in the urethane, and hence the water-absorbing property of the polymer is increased to reduce the volume resistivity of the surface layer, which may cause injection charging. On the other hand, when the hydroxy group-terminated prepolymer and the isocyanate group-terminated prepolymer are subjected to heat curing, excessive use of the isocyanate is avoided and thus urethane in which the amount of an unreacted polyol or polar functional groups is small can be obtained.

(A) Polyol Compound

The polyol is selected from known polycarbonate polyols and polyester polycarbonate copolymerized polyols. Examples of the polycarbonate polyols include a polynonamethylene carbonate diol, a poly(2-methyl-octamethylene) carbonate diol, a polyhexamethylenecarbonate diol, a polypentamethylenecarbonate diol, a poly(3-methylpentamethylene)carbonate diol, a polytetramethylenecarbonate diol, a polytrimethylenecarbonate diol, a poly(1,4-cyclohexane dimethylenecarbonate) diol, a poly(2-ethyl-2-butyl-trimethylene)carbonate diol, and random/block copolymers thereof.

Examples of the polyester polycarbonate copolymerized polyols include: a copolymer obtained by polycondensing a lactone, such as ϵ-caprolactone, with the above-mentioned polycarbonate polyol; and a copolymer with a polyester obtained by polycondensing a diol, such as 1,4-butanediol, 1,5-pentanediol, 1,6-hexanediol, 3-methylpentanediol, or neopentylglycol, and a dicarboxylic acid, such as adipic acid or sebacic acid.

(B) Polyisocyanate Compound

The polyisocyanate is selected from known polyisocyanates, which are generally used, and examples thereof include a toluene diisocyanate (TDI), a diphenylmethane diisocyanate (MDI), a polymeric diphenylmethane polyisocyanate, a hydrogenated MDI, a xylylene diisocyanate (XDI), a hexamethylene diisocyanate (HDI), and an isophorone diisocyanate (IPDI). Of those, an aromatic isocyanate, such as a toluene diisocyanate (TDI), a diphenylmethane diisocyanate (MDI), or a polymeric diphenylmethane polyisocyanate, is more suitably used.

The ratio of the number of isocyanate groups to the number of hydroxy groups (hereinafter sometimes expressed as "ratio of NCO/OH") is preferably from 1.0 to 2.0. When the ratio of NCO/OH is from 1.0 to 2.0, a crosslinking reaction proceeds to suppress bleeding of an unreacted component or low-molecular-weight polyurethane. The ratio of NCO/OH is more preferably from 1.0 to 1.6. When the ratio of NCO/OH is from 1.0 to 1.6, the bleeding is suppressed and the hardness of the polymer can be reduced.

[Other Additive]

In the present invention, any other additive may be added as required to the extent that the effect of the present invention is not impaired. As the additive, for example, extenders, crosslinking agents, pigments, flame retardants, and other low-molecular-weight polyols, silicone additives, and amines and tin complexes serving as catalysts may be added. In the present invention, the addition of a silicone additive to the surface layer is particularly preferred because the addition increases the resistance of the surface layer and imparts slidability thereto, thereby suppressing injection charging and improving wear resistance. It should be noted that it is recommended to avoid the use of a polyol having a tertiary amino group or a polyol having an ionic functional group, such as a quaternary ammonium group, a sulfonic acid group, or a sulfonate group, as a monomer for a copolymer. This is because those functional groups each have a high polarity, and hence their use reduces the volume resistivity of the polymer, with the result that injection charging is liable to occur.

[Electroconductive Fine Particles]

The surface layer of the electroconductive member desirably has electroconductivity. As a method of imparting electroconductivity, there is given addition of an ion conductive agent or electroconductive fine particles, and electroconductive particles which are inexpensive and undergo less environmental fluctuation in electrical resistance value are suitably used. Examples of the electroconductive particles may include: carbon black; metal oxide-based electroconductive particles, such as titanium oxide, tin oxide, and zinc oxide; and metal-based electroconductive particles, such as aluminum, iron, copper, and silver. In addition, one kind of those electroconductive particles may be used alone, or two or more kinds thereof may be used in combination.

In addition, it is preferred that the surface layer contain electroconductive fine particles having a number average particle diameter of 10 nm or more and 100 nm or less and part of the electroconductive fine particles be exposed at the surface of the surface layer. This is because the exposure of the electroconductive fine particles at the surface of the surface layer reduces friction between the electroconductive member and the photosensitive member to be brought into contact therewith, thus suppressing abrasion of the surface layer of the electroconductive member.

When the surface layer of the electroconductive roller is formed by dip coating, a skin layer is formed at the outermost surface of the surface layer, and hence the electroconductive fine particles are not exposed and the friction-reducing effect is not sufficiently obtained. As a technique for exposing the electroconductive fine particles at the surface of the surface layer, the electroconductive fine particles of the present invention may be exposed by removing the skin layer by a method of removing the skin layer at the outermost surface, such as UV treatment, a grinding method, an electrolytic grinding method, a chemical grinding method, or an ion milling method. In the present invention, by virtue of the low hardness of the surface layer, the skin layer can be sufficiently removed to expose the electroconductive fine particles even by the UV treatment. As compared to the grinding method or the like, the UV treatment can expose the electroconductive fine particles while minimizing damage to the surface layer, and hence this technique is preferred. An exposure state may be confirmed by taking an image of an arbitrary 2-μm square region using a scanning electron microscope (SEM).

[Resin Particles for Roughness Adjustment]

The surface layer of the electroconductive member may contain resin particles for roughness adjustment made of an organic compound or particles for roughness adjustment made of an inorganic compound to the extent that the effect of the present invention is not impaired. An example of the resin particles for roughness adjustment made of an organic compound is particles formed of a polymer compound. Of the particles formed of a polymer compound, particles of an acrylic resin, a polycarbonate resin, a styrene resin, a urethane resin, a fluororesin, and a silicone resin are preferred from the viewpoint that the particles are easily deformed because of their low hardness and can be allowed to be uniformly present in a binder resin in the surface layer. Examples of the particles for roughness adjustment made of an inorganic compound may include particles of titanium oxide, silica, alumina, magnesium oxide, strontium titanate, barium titanate, barium sulfate, calcium carbonate, mica, zeolite, and bentonite. One kind of those particles may be used, or two or more kinds thereof may be used in combination. In addition, those particles may be subjected to, for example, surface treatment, modification, introduction of a functional group or a molecular chain, or coating.

The resin particles for roughness adjustment to be used have, for example, a number average particle diameter of 3 μm or more and 30 μm or less.

In addition, in a surface layer containing such particles for roughness adjustment and having a protruded portion derived from the particles formed on the surface thereof, a surface hardness at the protruded portion derived from the particles is preferably set to a predetermined value or less. In this case, in the present invention, the surface hardness of the surface layer at the protruded portion derived from the particles for roughness adjustment is expressed in "Martens hardness" as described below. In addition, the Martens hardness at the protruded portion derived from the resin particles is preferably 10.0 $N/mm^2$ or less, particularly preferably 5.0 $N/mm^2$ or less. With this, the generation of a flaw in the surface of the photosensitive member when the charging roller is brought into contact with the photosensitive member can be suppressed. In addition, the deformation of toner due to the protruded portion derived from the particles can be suppressed.

The Martens hardness of the surface layer of the charging roller at the protruded portion derived from the particles may be measured using, for example, an ultra-micro hardness tester (trade name: PICODENTOR HM-500, manufactured by Fischer Instruments K.K.). As an indenter for the measurement, a Vickers indenter made of diamond having the shape of a square pyramid is used. In addition, measurement conditions are as follows: the tip of the Vickers indenter is brought into abutment with the center of the protruded portion derived from the particles of the surface layer of the charging roller, the indenter is then driven into the surface layer at a predetermined speed, and a Martens hardness (N=0.04 mN) when the load reaches 0.04 mN is measured. In addition, the Martens hardness of the protruded portion derived from the particles for roughness adjustment thus measured correlates well with a suppressing effect on cracking or deformation of toner which causes contamination of the surface of the charging roller. It should be noted that details of the measurement method are described in Examples.

The surface layer may be formed by an application method such as electrostatic spray application, dipping application, or ring application. Alternatively, the surface layer may be formed by bonding or coating a sheet- or tube-shaped layer formed so as to have a predetermined thickness in advance. Alternatively, a method involving curing a material in a mold to mold the material into a predetermined shape may be employed. Of those, the following is preferred. A coating is applied by an application method so that a coating film may be formed.

[Substrate]

As the electroconductive substrate of the charging roller, there may be used a substrate made of a metal (made of an alloy) (for example, a columnar metal) formed of, for example, iron, copper, stainless steel, aluminum, an aluminum alloy, or nickel.

[Elastic Layer]

The electroconductive elastic layer of the charging roller is obtained by, for example, dispersing an electroconductive agent in a polymer elastic body, followed by molding. Examples of the polymer elastic body include: a synthetic rubber, such as an epichlorohydrin rubber, an acrylonitrile-butadiene rubber, a chloroprene rubber, a urethane rubber, a silicone rubber, an ethylene-propylene rubber (EPM), an ethylene-propylene rubber (EPDM), a nitrile rubber (NBR), a butadiene rubber, or a styrene-butadiene rubber; a natural rubber, an isoprene rubber; and a thermoplastic elastomer, such as a styrene-butadiene-styrene block-copolymer (SBS), or a styrene-ethylenebutylene-styrene block-copolymer (SEBS). In particular, an epichlorohydrin rubber is suitably used as the polymer elastic body. The epichlorohydrin rubber can exhibit satisfactory electroconductivity even when the addition amount of the electroconductive agent is small because the polymer itself has electroconductivity in a medium-resistance region. In addition, the epichlorohydrin rubber can reduce a position-dependent variation in electrical resistance in the elastic layer, and hence is suitably used as the polymer elastic body.

Examples of the epichlorohydrin rubber include an epichlorohydrin homopolymer, an epichlorohydrin-ethylene oxide copolymer, an epichlorohydrin-allyl glycidyl ether copolymer, and an epichlorohydrin-ethylene oxide-allyl glycidyl ether terpolymer. Of those, an epichlorohydrin-ethylene oxide-allyl glycidyl ether terpolymer is particularly suitably used because the terpolymer shows stable electroconductivity in the medium-resistance region. The electroconductivity and processability of the epichlorohydrin-ethylene oxide-allyl glycidyl ether terpolymer may be controlled by arbitrarily adjusting its degree of polymerization or composition ratio. The polymer elastic body in the elastic layer, which may be formed of the epichlorohydrin rubber alone, may contain any other general rubber, such as the above-mentioned rubber, as required while containing the epichlorohydrin rubber as a main component. The general rubber is more preferably used in an amount of from 1 part by mass to 50 parts by mass with respect to 100 parts by mass of the epichlorohydrin rubber.

An ion conductive agent or an electron conductive agent may be used as the electroconductive agent in the elastic layer. For the purpose of reducing unevenness of the electrical resistance of the elastic layer, the elastic layer preferably contains an ion conductive agent. When the ion conductive agent is uniformly dispersed in the elastic layer to uniformize the electrical resistance of the elastic layer, uniform charging can be obtained even when the charging roller is used under the application of a voltage formed only of a DC voltage.

The ion conductive agent is not particularly limited as long as the ion conductive agent exhibits ion conductivity, and examples thereof include: an inorganic ionic material, such as lithium perchlorate, sodium perchlorate, or calcium perchlorate; a quaternary ammonium salt, such as lauryl trimethylammonium chloride, stearyl trimethylammonium chloride, or tetrabutylammonium perchlorate; and an inorganic salt of an organic acid, such as lithium trifluoromethanesulfonate, or potassium perfluorobutanesulfonate. One kind of those ion conductive agents may be used alone, or two or more kinds thereof may be used in combination. Of the ion conductive agents, a quaternary ammonium perchlorate is particularly suitably used because of stable electrical resistance of the elastic layer against an environmental change.

The electron conductive agent is not particularly limited as long as the electroconductive particles exhibit electron conductivity, and examples thereof include: carbon black, such as furnace black, thermal black, acetylene black, or Ketjen black; metal oxide-based electroconductive particles, such as titanium oxide, tin oxide, or zinc oxide; and metal-based electroconductive particles, such as aluminum, iron, copper, or silver. One kind of those electron conductive agents may be used alone, or two or more kinds thereof may be used in combination.

The compounding amount of the electroconductive agent is preferably determined so that the volume resistivity of the elastic layer becomes from $1\times10^3$ Ω·cm to $1\times10^9$ Ω·cm under each of a low-temperature and low-humidity environment (temperature: 15° C., relative humidity: 10%), a normal-temperature and normal-humidity environment (temperature: 23° C., relative humidity: 50%), and a high-temperature and high-humidity environment (temperature: 30° C., relative humidity: 80%). This is because a charging member exhibiting satisfactory charging performance is obtained. In addition to the foregoing, as required, the elastic layer may contain the following compounding agents: a plasticizer, a filler, a vulcanizing agent, a vulcanization accelerator, an age resistor, an anti-scorching agent, a dispersant, and a release agent. The volume resistivity of the elastic layer may be measured using a sample for measurement obtained by: molding a composition formed of all materials to be used in the elastic layer into a sheet having a thickness of 1 mm; and depositing metals from the vapor onto both surfaces of the sheet to form an electrode and a guard electrode. A specific measurement method therefor is similar to the measurement method for the volume resistivity of the surface layer described above.

The hardness of the elastic layer is preferably 70° or less, more preferably 60° or less in terms of microhardness (Model MD-1). When the microhardness (Model MD-1) exceeds 70°, a nip width between the charging roller and the photosensitive member becomes small. Accordingly, an abutting force between the charging roller and the photosensitive member converges on a narrow area, and hence an abutting pressure enlarges in some cases. In addition, the microhardness (Model MD-1) is preferably 50° or more. It should be noted that the "microhardness (Model MD-1)" is the hardness of the charging roller measured using an ASKER micro-rubber hardness tester Model MD-1 (trade name, manufactured by Kobunshi Keiki Co., Ltd.). Specifically, the "microhardness (Model MD-1)" is a value measured for the charging roller which has been left under a normal-temperature and normal-humidity (temperature: 23° C., relative humidity: 55%) environment for 12 hours or more with the hardness tester in a peak-hold mode of 10 N.

As a method of forming the elastic layer, it is preferred to mix raw materials including the electroconductive agent and the polymer elastic body with a closed mixer, followed by forming by a known method such as extrusion molding, injection molding, or compression molding. In addition, the elastic layer may be produced by directly molding the electroconductive elastic body on the electroconductive substrate, or may be formed by covering the electroconductive substrate with the electroconductive elastic body which has been molded into a tube shape in advance. It should be noted that after the production of the elastic layer, its surface may be ground to adjust its shape.

<Process Cartridge and Electrophotographic Image-Forming Apparatus>

The electroconductive member according to the present invention may be incorporated as a charging member into each of a process cartridge and an electrophotographic apparatus. A process cartridge according to the present invention includes an electrophotographic photosensitive member, and a charging member arranged in contact with the electrophotographic photosensitive member, the process cartridge being removably mounted onto the main body of an electrophotographic image-forming apparatus, in which the charging member is the above-mentioned electroconductive member for electrophotography. An electrophotographic image-forming apparatus according to the present invention includes an electrophotographic photosensitive member, and a charging member arranged in contact with the electrophotographic photosensitive member, in which the charging member is the above-mentioned electroconductive member for electrophotography.

FIG. 1 is a schematic cross-sectional view for illustrating an example of the image-forming apparatus of the present invention. An electrostatic latent image-bearing member 11, which is an image-bearing member having an electrostatic latent image formed thereon, is rotated in a direction indicated by an arrow R1. A toner-carrying member 13 is rotated in a direction indicated by an arrow R2, thereby conveying a toner 113 to a developing region where the toner-carrying member 13 and the electrostatic latent image-bearing member 11 are opposed to each other. In addition, a toner-supplying member 14 is brought into contact with the toner-carrying member 13, and is rotated in a direction indicated by an arrow R3, thereby supplying the toner 113 to the surface of the toner-carrying member.

Around the electrostatic latent image-bearing member (electrophotographic photosensitive member) 11, there are arranged a charging member (charging roller) 12, a transferring member (transfer roller) 16, a cleaner container 17, a cleaning blade 18, a fixing device 19, a pickup roller 110, and the like. The electrostatic latent image-bearing member 11 is charged by the charging roller 12. Then, the electrostatic latent image-bearing member 11 is exposed by being irradiated with laser light through the use of a laser-generating apparatus 112, and thus an electrostatic latent image corresponding to an image of interest is formed on the charged surface of the electrostatic latent image-bearing member. The electrostatic latent image on the electrostatic latent image-bearing member is developed with the toner 113 in a developing device 15 to provide a toner image. The toner image is transferred onto a transfer material (paper) 111 by the transferring member (transfer roller) 16 abutting with the electrostatic latent image-bearing member 11 through the intermediation of the transfer material. The transfer material (paper) 111 having the toner image thereon is carried to the fixing device 19, and the toner image is fixed onto the transfer material (paper) 111. In addition, part of the toner 113 remaining on the electrostatic latent image-bearing member 11 is scraped off with the cleaning blade 18 and stored in the cleaner container 17.

As a charging apparatus to be included in the electrophotographic image-forming apparatus of the present invention, it is preferred to use a contact charging apparatus in which an electrostatic latent image-bearing member and a charging roller are brought into contact with each other while forming an abutment portion and which is configured to charge the surface of the electrostatic latent image-bearing member to a predetermined polarity and potential by applying a predetermined charging bias to the charging roller. When contact charging is performed as just described, stable uniform charging can be performed, and moreover, the generation of ozone can be reduced. In addition, in order to perform uniform charging by keeping the contact with the electrostatic latent image-bearing member uniform, it is more preferred to use a charging roller configured to be rotated in the same direction as the electrostatic latent image-bearing member.

A contact transferring step to be preferably applied in the electrophotographic image-forming apparatus of the present invention is exemplified by a step of electrostatically transferring the toner image onto a recording medium while the electrostatic latent image-bearing member is held in abutment with the transferring member having a voltage opposite in polarity to the toner applied thereto through the intermediation of the recording medium.

In the electrophotographic image-forming apparatus of the present invention, it is preferred that the thickness of a toner layer on the developer-carrying member be regulated by bringing a toner layer thickness-regulating member into abutment with the developer-carrying member through the intermediation of the toner. The toner layer thickness-regulating member to be brought into abutment with the developer-carrying member is generally a regulating blade, which may be suitably used in the present invention as well.

As the regulating blade, there may be used: a rubber elastic body, such as a silicone rubber, a urethane rubber, or NBR; a synthetic resin elastic body, such as polyethylene terephthalate; a metal elastic body, such as a phosphor-bronze plate or an SUS plate; or a composite thereof. Further, for the purpose of controlling toner chargeability, an elastic support, such as a rubber, a synthetic resin, or a metal elastic body, having a charge control substance, such as a resin, a rubber, a metal oxide, or a metal, bonded thereto so as to be brought into contact with the abutment portion of the developer-carrying member may be used. Of those, a metal elastic body having a resin or a rubber bonded thereto so as to be brought into contact with the abutment portion of the developer-carrying member is particularly preferred. A material for the member to be bonded to the metal elastic body is preferably one which is easy to charge to a positive polarity, such as a urethane rubber, a urethane resin, a polyamide resin, or a nylon resin.

A base portion serving as the upper edge side of the regulating blade is fixed and held onto the developing device side, and its lower edge side is brought into abutment with the surface of the developer-carrying member with an appropriate elastic pressing force in a state of being bent against the elastic force of the blade in the forward direction or reverse direction of the developer-carrying member.

It is effective that an abutting pressure between the regulating blade and the developer-carrying member is preferably 1.27 N/m or more and 245.00 N/m or less, more preferably 4.9 N/m or more and 118.0 N/m or less in terms of linear pressure in the generatrix line direction of the developer-carrying member. When the abutting pressure is 1.27 N/m or more, it is possible to more uniformly apply toner. When the abutting pressure is 245 N/m or less, it is possible to suppress the toner from being deteriorated due to a large pressure.

The amount of the toner layer on the developer-carrying member is preferably 2.0 $g/m^2$ or more and 12.0 $g/m^2$ or less, more preferably 3.0 $g/m^2$ or more and 10.0 $g/m^2$ or less. When the amount of the toner on the developer-carrying member is 2.0 $g/m^2$ or more, a sufficient image density can be easily obtained. Further, when the amount of the toner on the developer-carrying member is 12.0 $g/m^2$ or less, regulation failure can be effectively avoided, and uniform chargeability is hard to be impaired, occurrence of fog in the electrophotographic image can be suppressed.

It should be noted that in the present invention, the amount of the toner on the developer-carrying member may be arbitrarily changed by changing the surface roughness (Ra) of the developer-carrying member, the free length of the regulating blade, and the abutting pressure of the regulating blade.

In order to develop the toner carried on the developer-carrying member, a developing bias voltage serving as a bias unit is applied to the developer-carrying member. When a DC voltage is used as the developing bias voltage, a voltage having a value between the potential of an image portion of the electrostatic latent image (region to be visualized through the adhesion of a developer) and the potential of a non-image portion of the electrostatic latent image (region to which the developer does not adhere) is preferably applied to the developer-carrying member. The absolute value (Vcontrast) of a difference between the potential of the image portion of the electrostatic latent image and the developing bias potential preferably falls within the range of from 50 V or more to 400 V or less. When the absolute value is set to fall within this range, an image having a suitable density is formed. In addition, in order to increase the density of the developed image and improve tone reproduction, an alternating bias voltage may be applied to the developer-carrying member to form an oscillating electric field whose direction alternately inverts in the developing region.

The absolute value (Vback) of a difference between the potential of the non-image portion of the electrostatic latent image and the developing bias potential preferably falls within the range of from 50 V or more to 600 V or less. When the absolute value is set to fall within this range, development of the toner in the non-image portion can be suitably suppressed. Particularly in the case of a cleaner-less system having the cleaner container 17 and the cleaning blade 18 removed, Vback becomes insufficient due to paper dust adhering onto the photosensitive member, with the result that image failure is liable to occur, and toner remaining on the photosensitive member instead of being transferred onto paper needs to be recovered again in a developing container for storing toner, and hence Vback is preferably set to have a high value. The value is preferably set to fall within the range of from 300 V or more to 600 V or less.

In the electrophotographic image-forming apparatus of the present invention, the charging member is preferably configured to move at a different speed from that of the electrophotographic photosensitive member (electrostatic latent image-bearing member). In addition, the charging member is preferably configured to move while keeping the speed difference in a forward direction with respect to the moving direction of the electrophotographic photosensitive member. When such configuration is adopted in a cleaner-less electrophotographic image-forming apparatus, the migration of transfer residual toner on the electrophotographic photosensitive member onto the surface of the charging member can be suppressed.

According to the present invention, the electroconductive member for electrophotography capable of uniformly charging a photosensitive member irrespective of a use environment or the number of sheets subjected to image output can be provided. According to the present invention, the process cartridge and the electrophotographic image-forming apparatus which are capable of stably forming high-quality electrophotographic images over a long period of time can also be provided.

EXAMPLES

Now, the present invention is described in more detail by way of Examples, but the present invention is by no means limited thereto. Before Examples, the following production examples of raw materials and the like are described.

1. Production Examples of Elastic Rollers 1 to 4
2. Preparation and Production of Raw Materials for Surface Layer Formation
2-1. Preparation or Production Examples of Raw Material Polyols
2-2. Preparation of Raw Material Isocyanates B-1 to B-6
2-3. Production Examples of Hydroxy Group-terminated Urethane Prepolymers C-1 to C-14
2-4. Production Examples of Isocyanate Group-terminated Prepolymers D-1 to D-9
2-5. Preparation of Resin Particles E-1 to E-5 for Roughness Adjustment
2-6. Preparation of Silicone Additive F-1 to F-3
3. Production Examples of Coating Liquids G-1 to G-35 for Surface Layer Formation

[1. Production Examples of Elastic Rollers 1 to 4]

(Production of Elastic Roller 1)

A thermosetting adhesive (METALOC N-33, manufactured by Toyokagaku Kenkyusho Co., Ltd.) was applied to a columnar substrate made of steel having a diameter of 6 mm and a length of 252.5 mm (having a nickel-plated surface and hereinafter referred to as "mandrel"), and was dried at a temperature of 80° C. for 30 minutes and then dried at 120° C. for 1 hour. The resultant was used as an "electroconductive substrate". Materials whose kinds and amounts were as shown in Table 1 below were kneaded with a pressure kneader to provide an A kneaded rubber composition 1.

TABLE 1

| Material | Part(s) by mass |
|---|---|
| Epichlorohydrin rubber (trade name: EPICHLOMER CG-102, manufactured by Daiso Co., Ltd.) | 100 |
| Calcium carbonate | 60 |
| Aliphatic polyester-based plasticizer (trade name: Polycizer P-202, manufactured by Dainippon Ink and Chemicals, Inc.) | 10 |
| Zinc stearate | 1 |
| 2-Mercaptobenzimidazole | 0.5 |
| Zinc oxide | 2 |
| Quaternary ammonium salt (trade name: LX-N30N, manufactured by Daiso Co., Ltd.) | 1 |
| Carbon black (trade name: Thermax Floform N990, manufactured by Cancarb Limited) | 5 |

Further, the A kneaded rubber composition and materials whose kinds and amounts were as shown in Table 2 below were kneaded with an open roll to prepare an unvulcanized rubber composition 1.

TABLE 2

| Material | Part by mass |
|---|---|
| Sulfur (trade name: Sulfax PMC, manufactured by Tsurumi Chemical Industry Co., Ltd.) | 0.8 |
| Di-2-benzothiazolyl disulfide (trade name: NOCCELER DM-P, manufactured by Ouchi Shinko Chemical Industrial Co., Ltd.) | 1 |
| Tetramethylthiuram monosulfide (trade name: NOCCELER TS, manufactured by Ouchi Shinko Chemical Industrial Co., Ltd.) | 0.5 |

Next, a crosshead extruder having a mechanism for supplying an electroconductive substrate and a mechanism for discharging an unvulcanized rubber roller was used to extrude the unvulcanized rubber composition 1 onto the electroconductive substrate coaxially into a cylindrical shape having an outer diameter of from 8.75 mm to 8.90 mm, to thereby form a layer of the unvulcanized rubber composition. Next, the roller was loaded into a hot-air vulcanization furnace at 160° C., and heated for 60 minutes to vulcanize the layer of the unvulcanized rubber composition, to thereby form an elastic layer. Both end portions of the rubber layer were cut off to adjust the length of the rubber layer to 229 mm, and then the surface of the roller was ground with a rotary grindstone so as to have a roller shape having an outer diameter of 8.5 mm. Thus, an elastic roller 1 was obtained. It should be noted that the roller had a crown amount (average value of a difference between the outer diameter at a central portion and the outer diameter at a position away from the central portion by 90 mm toward each of both end portion directions) of 110 μm.

(Production of Elastic Roller 2)

An elastic roller 2 was produced in the same manner as in the case of the production of the elastic roller 1 except that the epichlorohydrin rubber (CG-102) was changed to an epichlorohydrin rubber (EO-EP-AGE terpolymer, EO/EP/AGE=73 mol %/23 mol %/4 mol %).

(Production of Elastic Roller 3)

An elastic roller 3 was produced in the same manner as in the case of the production of the elastic roller 1 except that the quaternary ammonium salt was changed to 2 parts by mass of ADK CIZER LV70 (manufactured by ADEKA CORPORATION).

(Production of Elastic Roller 4)

A primer (trade name: DY35-051, manufactured by Dow Corning Toray Co., Ltd.) was applied to a mandrel similar to that used in the elastic roller 1, and was baked at a temperature of 150° C. for 30 minutes. The resultant was used as an electroconductive substrate. The electroconductive substrate was placed in a die, and an addition-type silicone rubber composition obtained by mixing materials whose kinds and amounts were as shown in Table 3 below was injected into a cavity formed in the die.

TABLE 3

| Material | Part(s) by mass |
|---|---|
| Liquid silicone rubber material (trade name: SE6724A/B, manufactured by Dow Corning Toray Silicone Co., Ltd.) | 100 |
| Carbon black (trade name: TOKABLACK #4300, manufactured by Tokai Carbon Co., Ltd.) | 15 |
| Silica powder as heat resistance imparting agent | 0.2 |
| Platinum catalyst | 0.1 |

Next, the die was heated to cure the silicone rubber through vulcanization at 150° C. for 15 minutes. The electroconductive substrate having a cured silicone rubber layer formed on its circumferential surface was removed from the die, and then further heated at 180° C. for 1 hour to complete the curing reaction of the silicone rubber layer. Both end portions of the rubber layer were cut off to adjust the length of the rubber layer to 229 mm. Thus, an elastic roller 4 having an outer diameter of 8.5 mm was obtained.

[2. Preparation and Production of Raw Materials for Surface Layer Formation]

[2-1. Preparation or Production Examples of Raw Material Polyols]

Now, synthesis examples for obtaining the polyurethane surface layer of the present invention are described.

[Measurement of Number Average Molecular Weight of Raw Material Polyol]

Instruments and conditions used for measurement of a number average molecular weight (Mn) in production examples are as follows:

Measurement instrument: HLC-8120GPC (manufactured by Tosoh Corporation);

Column: TSKgel SuperHZMM (manufactured by Tosoh Corporation)×2;

Solvent: THF (with 20 mmol/L triethylamine);

Temperature: 40° C.; and

Flow rate of THF: 0.6 ml/min.

It should be noted that a 0.1 mass % tetrahydrofuran (THF) solution was used as a measurement sample. Further, the measurement was carried out by using a refractive index (RI) detector as a detector.

A calibration curve was made by using TSK standard polystyrene A-1000, A-2500, A-5000, F-1, F-2, F-4, F-10, F-20, F-40, F-80, or F-128 manufactured by Tosoh Corporation as a standard sample for making the calibration curve. The number average molecular weight was determined from the retention time of the measurement sample based on the calibration curve.

[Preparation of Raw Material Polyols]

Commercially available raw material polyols were purchased as 16 kinds of raw material polyols A-1 to A-16 shown in Table 4 below. In addition, raw material polyols A-17 and A-18 were synthesized.

TABLE 4

| No. | Raw material polyol |
|---|---|
| A-1 | DURANOL T5652 Mn = 2,000 (manufactured by Asahi Kasei Chemicals Corporation) |
| A-2 | DURANOL G4672 Mn = 2,000 (manufactured by Asahi Kasei Chemicals Corporation) |
| A-3 | DURANOL G3452 Mn = 2,000 (manufactured by Asahi Kasei Chemicals Corporation) |
| A-4 | DURANOL T4692 Mn = 2,000 (manufactured by Asahi Kasei Chemicals Corporation) |
| A-5 | Kuraray Polyol C2050 Mn = 2,000 (manufactured by KURARAY Co., Ltd.) |
| A-6 | Kuraray Polyol C2090 Mn = 2,000 (manufactured by KURARAY Co., Ltd.) |
| A-7 | Kuraray Polyol C3090 Mn = 3,000 (manufactured by KURARAY Co., Ltd.) |
| A-8 | Kuraray Polyol C2015N Mn = 2,000 (manufactured by KURARAY Co., Ltd.) |
| A-9 | Kuraray Polyol C2060N Mn = 2,000 (manufactured by KURARAY Co., Ltd.) |
| A-10 | NIPPOLLAN 982 Mn = 2,000 (manufactured by Nippon Polyurethane Industry Co., Ltd.) |
| A-11 | ETERNACOLL UH-200 Mn = 2,000 (manufactured by Ube Industries, Ltd.) |
| A-12 | ETERNACOLL UH-300 Mn = 3,000 (manufactured by Ube Industries, Ltd.) |
| A-13 | ETERNACOLL UC-100 Mn = 1,000 (manufactured by Ube Industries, Ltd.) |
| A-14 | ETERNACOLL UM-90 (1:1) Mn = 900 (manufactured by Ube Industries, Ltd.) |
| A-15 | ETERNACOLL UM-90 (1:3) Mn = 900 (manufactured by Ube Industries, Ltd.) |
| A-16 | Oxymer M112 Mn = 1,000 (manufactured by Perstorp Japan Co., Ltd.) |

[Synthesis of Raw Material Polyol A-17]

Under a nitrogen atmosphere, 100.0 g of 1,3-propanediol, 49.4 g of adipic acid, and 69.5 g of ethylene carbonate were mixed and heated, and while the temperature was increased to 200° C., generated ethylene glycol and water were removed by evaporation from the reaction system. After the ethylene glycol and the water had been removed by evaporation, 15 ppm of titanium tetraisopropoxide was added, and a polycondensation reaction was allowed to proceed under a reduced pressure of 266.7 Pa. The reaction liquid was cooled to room temperature to provide the raw material polyol A-17. The resultant raw material polyol A-17 had a number average molecular weight of 2,030.

[Synthesis of Raw Material Polyol A-18]

The raw material polyol A-18 was produced by the same method as in the case of the raw material polyol A-17 except that starting raw materials shown in Table 5 below were used. The raw material polyol A-18 had a number average molecular weight of 2,040.

TABLE 5

| Raw material polyol No. | Diol (parts by mass) | Dicarboxylic acid (parts by mass) | Ethylene carbonate (parts by mass) | Ester group/carbonate group (molar ratio) | Number average molecular weight |
|---|---|---|---|---|---|
| A-17 | 1,3-Butanediol (100.0) | Adipic acid (49.4) | 69.5 | 3/7 | 2,030 |
| A-18 | 1,6-Hexanediol (100.0) | Sebacic acid (102.8) | 19.2 | 7/3 | 2,040 |

[2-2. Preparation of Raw Material Isocyanates B-1 to B-6]

Raw material isocyanates shown in Table 6 below were prepared.

TABLE 6

| No. | Raw material isocyanate |
|---|---|
| B-1 | Diphenylmethane diisocyanate (MDI) (trade name: Millionate MT manufactured by Nippon Polyurethane Industry Co., Ltd.) |
| B-2 | Polymethylene polyphenyl polyisocyanate (polymeric MDI) (trade name: Millionate MR200 manufactured by Nippon Polyurethane Industry Co., Ltd.) |
| B-3 | Toluene diisocyanate (TDI) (trade name: CORONATE T-80 manufactured by Nippon Polyurethane Industry Co., Ltd.) |
| B-4 | Adduct of toluene diisocyanate and trimethylolpropane (trade name: CORONATE L manufactured by Nippon Polyurethane Industry Co., Ltd.) |
| B-5 | Hexamethylene diisocyanate (trade name: DURANATE 50M-HDI manufactured by Asahi Kasei Chemicals Corporation) |
| B-6 | Isocyanurate trimer of hexamethylene diisocyanate (trade name: DURANATE TPA-100 manufactured by Asahi Kasei Chemicals Corporation) |

methyl ethyl ketone (MEK) was added to the resultant reaction product to form a solution having a solid content of 50 parts by mass. Thus, a hydroxy group-terminated urethane prepolymer C-1 was produced.

TABLE 7

| Material | Parts by mass |
|---|---|
| Raw material polyol A-1 (trade name: DURANOL T5652 manufactured by Asahi Kasei Chemicals Corporation) | 100 |
| Raw material isocyanate B-1 (trade name: MILLIONATE MT manufactured by Nippon Polyurethane Industry Co., Ltd.) | 6.3 |

[Synthesis of Hydroxy Group-Terminated Urethane Prepolymers C-2 to C-14]

Hydroxy group-terminated urethane prepolymers C-2 to C-14 were produced by the same method as in the case of the synthesis of the hydroxy group-terminated urethane prepolymer C-1 using starting raw materials shown in Table 8 below.

The chemical structures of the hydroxy group-terminated urethane prepolymers C-1 to C-14 were identified using $^{1}H$-NMR and $^{13}C$-NMR. It should be noted that in Table 8, the values of p, q, r, s, m, n, and k in the structural formulae (1), (2), (3), and (4) are average values.

TABLE 8

| Hydroxy group-terminated urethane prepolymer No. | Raw material polyol No. | Raw material polyol Parts by mass | Raw material isocyanate No. | Raw material isocyanate Parts by mass | Structure contained in molecule | | | |
|---|---|---|---|---|---|---|---|---|
| C-1 | A-1 | 100.0 | B-1 | 6.3 | Formula (1) | $R_{11} = (CH_2)_5$ | $R_{12} = (CH_2)_6$ | p, q = 6.9 |
| C-2 | A-2 | 100.0 | B-1 | 5.7 | Formula (1) | $R_{11} = (CH_2)_4$ | $R_{12} = (CH_2)_6$ | p = 10.7, q = 4.6 |
| C-3 | A-3 | 100.0 | B-1 | 6.3 | Formula (1) | $R_{11} = (CH_2)_3$ | $R_{12} = (CH_2)_4$ | p, q = 8.8 |
| C-4 | A-4 | 100.0 | B-1 | 6.3 | Formula (1) | $R_{11} = (CH_2)_4$ | $R_{12} = (CH_2)_6$ | p = 14.5, q = 1.6 |
| C-5 | A-5 | 100.0 | B-1 | 6.3 | Formula (1) | $R_{11} = (CH_2)_6$ | $R_{12} = (CH_2)_2$—CHMe—$(CH_2)_2$ | p, q = 6.5 |
| C-6 | A-6 | 100.0 | B-1 | 6.3 | Formula (1) | $R_{11} = (CH_2)_6$ | $R_{12} = (CH_2)_2$—CHMe—$(CH_2)_2$ | p = 1.3, q = 11.8 |
| C-7 | A-7 | 100.0 | B-1 | 4.2 | Formula (1) | $R_{11} = (CH_2)_6$ | $R_{12} = (CH_2)_2$—CHMe—$(CH_2)_2$ | p = 2.0, q = 18.0 |
| C-8 | A-8 | 100.0 | B-1 | 6.3 | Formula (1) | $R_{11} = (CH_2)_9$ | $R_{12} = CH_2$—CHMe—$(CH_2)_6$ | p = 6.5, q = 3.5 |
| C-9 | A-9 | 100.0 | B-1 | 6.3 | Formula (1) | $R_{11} = (CH_2)_9$ | $R_{12} = CH_2$—CHMe—$(CH_2)_6$ | p = 3.5, q = 6.5 |
| C-10 | A-10 | 100.0 | B-5 | 4.3 | Formula (2) | | r = 9.1 s = 5.5 | |
| C-11 | A-17 | 100.0 | B-1 | 6.3 | Formula (3) | $R_{31} = (CH_2)_3$ | $R_{32} = (CH_2)_4$ | m = 12, n = 5.1 |
| C-12 | A-18 | 100.0 | B-1 | 6.3 | Formula (3) | $R_{31} = (CH_2)_6$ | $R_{32} = (CH_2)_8$ | m = 2.7, n = 6.3 |
| C-13 | A-11 | 100.0 | B-1 | 6.3 | Formula (4) | | $R_{41} = (CH_2)_6$ | k = 13.2 |
| C-14 | A-1 | 100.0 | B-3 | 4.8 | Formula (1) | $R_{11} = (CH_2)_5$ | $R_{12} = (CH_2)_6$ | p, q = 6.9 |

[2-3. Production Examples of Hydroxy Group-Terminated Urethane Prepolymers C-1 to C-14]

[Synthesis of Hydroxy Group-Terminated Urethane Prepolymer C-1]

Under a nitrogen atmosphere, materials shown in Table 7 below were subjected to a reaction by being heated and stirred at a temperature of 90° C. for 3 hours. After that,

[2-4. Production Examples of Isocyanate Group-Terminated Prepolymers D-1 to D-9]

[Synthesis of Isocyanate Group-Terminated Prepolymer D-1]

Under a nitrogen atmosphere, materials shown in Table 9 below were subjected to a reaction by being heated and stirred at a temperature of 90° C. for 3 hours. After that, methyl ethyl ketone (MEK) was added to the resultant reaction product to form a solution having a solid content of 50 parts by mass. Thus, an isocyanate group-terminated prepolymer D-1 was produced.

TABLE 9

| Material | Parts by mass |
|---|---|
| Raw material polyol A-10 (trade name: NIPPOLAN 982 manufactured by Nippon Polyurethane Industry Co., Ltd.) | 100 |
| Raw material polyisocyanate B-2 (trade name: MILLIONATE MR200 manufactured by Nippon Polyurethane Industry Co., Ltd.) | 33.5 |

[Synthesis of Isocyanate Group-Terminated Prepolymers D-2 to D-9]

Isocyanate group-terminated prepolymers D-2 to D-9 were produced by the same method as in the case of the synthesis of the isocyanate group-terminated prepolymer D-1 using starting raw materials whose kinds and amounts were as shown in Table 10 below.

The chemical structures of the isocyanate group-terminated prepolymers D-1 to D-9 were identified using $^1$H-NMR and $^{13}$C-NMR. It should be noted that in Table 10, the values of p, q, r, s, m, n, and k in the structural formulae (1), (2), (3), and (4) are average values.

TABLE 10

| Isocyanate group-terminated prepolymer No. | Raw material polyol No. | Raw material polyol Parts by mass | Raw material isocyanate No. | Raw material isocyanate Parts by mass | Structure contained in molecule | | |
|---|---|---|---|---|---|---|---|
| D-1 | A-10 | 100.0 | B-2 | 33.5 | Formula (2) | r = 9.1, S = 5.5 | |
| D-2 | A-14 | 100.0 | B-6 | 78.4 | Formula (1) | $R_{11} = (CH_2)_6$<br>$R_{12} = CH_2—CH<\begin{matrix}(CH_2)_2\\(CH_2)_2\end{matrix}>CH—CH_2$ | p, q = 2.7 |
| D-3 | A-15 | 100.0 | B-6 | 78.4 | Formula (1) | $R_{11} = (CH_2)_6$<br>$R_{12} = CH_2—CH<\begin{matrix}(CH_2)_2\\(CH_2)_2\end{matrix}>CH—CH_2$ | p = 4.1<br>q = 1.4 |
| D-4 | A-13 | 100.0 | B-6 | 70.3 | Formula (4) | $R_{41} = CH_2—CH<\begin{matrix}(CH_2)_2\\(CH_2)_2\end{matrix}>CH—CH_2$ | k = 5.8 |
| D-5 | A-11 | 100.0 | B-2 | 33.5 | Formula (4) | $R_{41} = (CH_2)_6$ | k = 13.2 |
| D-6 | A-12 | 100.0 | B-2 | 28.2 | Formula (4) | $R_{41} = (CH_2)_6$ | k = 20.1 |
| D-7 | A-16 | 100.0 | B-6 | 70.3 | Formula (4) | $R_{41} = CH_2—CEtBu—CH_2$ | k = 4.6 |
| D-8 | A-10 | 100.0 | B-4 | 102.2 | Formula (2) | r = 9.1, S = 5.5 | |
| D-9 | A-1 | 100.0 | B-2 | 33.5 | Formula (1) | $R_{11} = (CH_2)_6$ $R_{12} = (CH_2)_6$ | p:q = 1:1 |

[2-5. Preparation of Resin Particles E-1 to E-5 for Roughness Adjustment]

Resin particles for roughness adjustment shown in Table 11 below were prepared.

TABLE 11

| No. | Resin particles for roughness adjustment |
|---|---|
| E-1 | DAIMICBEAZ UCN-5090D (average particle diameter: 9.0 μm, Dainichiseika Color & Chemicals Mfg. Co., Ltd.) |
| E-2 | DAIMICBEAZ UCN-5070D (average particle diameter: 7.0 μm, Dainichiseika Color & Chemicals Mfg. Co., Ltd.) |
| E-3 | DAIMICBEAZ UCN-5150D (average particle diameter: 15.0 μm, Dainichiseika Color & Chemicals Mfg. Co., Ltd.) |
| E-4 | Art-pearl JB-600T (average particle diameter: 10.0 μm, manufactured by Negami Chemical Industrial Co., Ltd) |
| E-5 | Techpolymer MBX-8 (average particle diameter: 8.0 μm, manufactured by Sekisui Plastics Co., Ltd.) |

[2-6. Preparation of Silicone Additives F-1 to F-3]

Silicone additives shown in Table 12 below were prepared.

TABLE 12

| No. | Silicone additive |
|---|---|
| F-1 | Modified dimethylsilicone oil (trade name: SH-28PA, manufactured by Dow Corning Toray Silicone Co., Ltd.) |
| F-2 | Silicone-modified acrylic resin (trade name: SQ-100, manufactured by Tokushiki Co., Ltd.) |
| F-3 | Silicone-modified acrylic resin (trade name: US-270, manufactured by Toagosei Co., Ltd.) |

[3. Production Examples of Coating Liquids G-1 to G-35 for Surface Layer Formation]

[3-1. Preparation of Coating Liquid G-1 for Surface Layer Formation]

Materials whose kinds and amounts were as shown in Table 13 below were loaded into a reaction vessel as materials for a coating liquid G-1 for surface layer formation, and were stirred. Next, methyl ethyl ketone (MEK) was added to achieve a total solid content ratio of 30 mass %, and then the contents were mixed in a sand mill. Next, MEK was added to adjust the viscosity of the liquid to the range of from 6 cps to 10 cps. Thus, the coating liquid G-1 for surface layer formation was produced.

TABLE 13

| Material | parts by mass |
|---|---|
| Hydroxy group-terminated urethane prepolymer C-1 | 100 |
| Isocyanate group-terminated prepolymer D-1 | 54.7 |
| Carbon black (trade name: MA230, manufactured by Mitsubishi Chemical Corporation) | 17 |

hydroxy group-terminated urethane prepolymer, an isocyanate group-terminated prepolymer, and carbon black shown in Table 14 below were mixed by the same method as in the case of the preparation of the coating liquid G-1 for surface layer formation. Next, a silicone additive or resin particles for roughness adjustment were added, and the contents were mixed in a sand mill for 10 minutes. After that, MEK was added to adjust the viscosity of the liquid to the range of from 6 cps to 10 cps. Thus, a coating liquid for surface layer formation was produced.

TABLE 14

| Coating liquid for surface layer formation No. | Hydroxy group-terminated urethane prepolymer No. | Hydroxy group-terminated urethane prepolymer parts by mass | Isocyanate group-terminated prepolymer No. | Isocyanate group-terminated prepolymer parts by mass | Resin particles for roughness adjustment No. | Resin particles for roughness adjustment parts by mass | Silicone additive No. | Silicone additive part(s) by mass | Carbon black parts by mass |
|---|---|---|---|---|---|---|---|---|---|
| G-1 | C-1 | 100.0 | D-1 | 54.7 | — | — | — | — | 17.0 |
| G-2 | C-2 | 100.0 | D-1 | 54.7 | — | — | — | — | 17.0 |
| G-3 | C-3 | 100.0 | D-1 | 54.7 | — | — | — | — | 17.0 |
| G-4 | C-4 | 100.0 | D-1 | 54.7 | — | — | — | — | 17.0 |
| G-5 | C-5 | 100.0 | D-1 | 54.7 | — | — | — | — | 17.0 |
| G-6 | C-6 | 100.0 | D-1 | 54.7 | — | — | — | — | 17.0 |
| G-7 | C-7 | 100.0 | D-1 | 37.2 | — | — | — | — | 15.1 |
| G-8 | C-8 | 100.0 | D-1 | 54.7 | — | — | — | — | 17.0 |
| G-9 | C-9 | 100.0 | D-1 | 54.7 | — | — | — | — | 17.0 |
| G-10 | C-10 | 100.0 | D-2 | 54.7 | — | — | — | — | 17.0 |
| G-11 | C-10 | 100.0 | D-3 | 54.7 | — | — | — | — | 17.0 |
| G-12 | C-11 | 100.0 | D-5 | 54.7 | — | — | — | — | 17.0 |
| G-13 | C-12 | 100.0 | D-5 | 54.7 | — | — | — | — | 17.0 |
| G-14 | C-1 | 100.0 | D-5 | 54.7 | — | — | — | — | 17.0 |
| G-15 | C-3 | 100.0 | D-5 | 54.7 | — | — | — | — | 17.0 |
| G-16 | C-5 | 100.0 | D-5 | 54.7 | — | — | — | — | 17.0 |
| G-17 | C-7 | 100.0 | D-5 | 37.2 | — | — | — | — | 15.1 |
| G-18 | C-13 | 100.0 | D-3 | 54.7 | — | — | — | — | 17.0 |
| G-19 | C-1 | 100.0 | D-6 | 54.7 | — | — | — | — | 17.0 |
| G-20 | C-7 | 100.0 | D-4 | 37.2 | — | — | — | — | 15.1 |
| G-21 | C-9 | 100.0 | D-7 | 54.7 | — | — | — | — | 17.0 |
| G-22 | C-13 | 100.0 | D-1 | 54.7 | — | — | — | — | 17.0 |
| G-23 | C-10 | 100.0 | D-4 | 54.7 | — | — | — | — | 17.0 |
| G-24 | C-10 | 100.0 | D-7 | 54.7 | — | — | — | — | 17.0 |
| G-25 | C-1 | 50.0 | D-5 | 54.7 | — | — | — | — | 17.0 |
|  | C-10 | 50.0 |  |  |  |  |  |  |  |
| G-26 | C-1 | 100.0 | D-1 | 54.7 | — | — | F-1 | 0.1 | 17.0 |
| G-27 | C-1 | 100.0 | D-1 | 54.7 | — | — | F-2 | 7.7 | 17.0 |
| G-28 | C-1 | 100.0 | D-8 | 54.7 | — | — | F-3 | 12.9 | 17.0 |
| G-29 | C-1 | 100.0 | D-1 | 54.7 | E-1 | 34.8 | — | — | 17.0 |
| G-30 | C-1 | 100.0 | D-1 | 54.7 | E-2 | 34.8 | — | — | 17.0 |
| G-31 | C-1 | 100.0 | D-1 | 54.7 | E-3 | 34.8 | — | — | 17.0 |
| G-32 | C-1 | 100.0 | D-1 | 54.7 | E-4 | 34.8 | — | — | 17.0 |
| G-33 | C-1 | 100.0 | D-1 | 54.7 | E-1 | 11.6 | — | — | 17.0 |
| G-34 | C-1 | 100.0 | D-1 | 54.7 | E-1 | 23.2 | — | — | 17.0 |
| G-35 | C-1 | 100.0 | D-1 | 54.7 | E-1 | 46.4 | — | — | 17.0 |

[3-2. Preparation of Coating Liquids G-2 to G-25 for Surface Layer Formation]

Coating liquids G-2 to G-25 for surface layer formation were produced by the same method as in the case of the preparation of the coating liquid G-1 for surface layer formation using starting raw materials whose kinds and amounts were as shown in Table 14 below.

[3-3. Preparation of Coating Liquids G-26 to G-35 for Surface Layer Formation]

Coating liquids G-26 to G-35 for surface layer formation were each produced by the following method. First, a

Example 1

[1. Production of Charging Roller]

The elastic roller 1 was dipped in the coating liquid G-1 for surface layer formation with its longitudinal direction being a vertical direction and its upper end portion being held, to coat the surface of the elastic roller 1 with the coating liquid. The dipping was performed under the following conditions: a dipping time was 9 seconds, and a roller-lifting speed was 20 mm/s as an initial speed and 2 mm/s as a final speed, and the speed was linearly changed with time between these values. The resultant coated product was air-dried at normal temperature for 30 minutes, then dried in a circulating hot air dryer set to 80° C. for 1 hour, and further dried in a circulating hot air dryer set to 160° C. for 1 hour. Thus, a charging roller 1 having a surface layer having a film thickness of 21 μm formed on an elastic layer was obtained. The charging roller 1 was subjected to the following measurement or evaluation.

[2. Measurement of Chemical Structure of Polymer in Surface Layer]

The surface layer obtained in this example was analyzed using a pyrolyzer (trade name: Pyrofoil Sampler JPS-700, (manufactured by Japan Analytical Industry Co., Ltd.) and a GC/MS apparatus (trade name: Focus GC/ISQ, manufactured by Thermo Fisher Scientific Inc.) at a pyrolysis temperature of 590° C. with helium as a carrier gas. As a result, it was confirmed from the resultant fragment peaks that the surface layer had a structure represented by the structural formula (1) and a structure represented by the structural formula (2). The analysis results are shown in Table 15-1.

[3. Measurement of Universal Hardness of Surface Layer]

The universal hardness of the surface layer at a depth of 1 μm from the surface thereof was measured with a universal hardness tester.

An ultra-micro hardness tester (trade name: FISCHERSCOPE HM-2000, manufactured by Helmut Fischer) was used for the measurement. Specific measurement conditions are shown below.

Indenter for measurement: Vickers indenter (angle 136°, Young's Module 1140 GPa, Poisson ratio 0.07, Material for indenter: diamond)

Measurement environment: temperature: 23° C., relative humidity: 50%

Maximum test load: 1.0 mN

Load condition: A load was applied in proportion to time at such a rate as to reach the maximum test load in 30 seconds.

In addition, in this evaluation, a load F when the indenter is driven to a depth of 1 μm from the surface of the surface layer, and a contact area A between the indenter and the surface layer at that time are used to calculate the universal hardness from the following equation (1).

$$\text{Universal hardness (N/mm}^2\text{)}=F/A \qquad \text{Equation (1)}$$

[4-1. Measurement of Surface Roughness of Surface Layer]

The arithmetic average roughness Ra of the surface of the surface layer of the charging roller 1 was measured. The measurement was performed based on JIS B0601:1982 using a surface roughness measuring instrument (trade name: Surfcorder SE3400, manufactured by Kosaka Laboratory Ltd.). A contact needle made of diamond having a tip radius of 2 μm was used, and the conditions were set as follows: a measurement speed of 0.5 mm/s, a cutoff frequency λc of 0.8 mm, a reference length of 0.8 mm, and an evaluation length of 8.0 mm. Measurement sites were a total of nine sites, i.e., three points in an axial direction by three points in a circumferential direction. At each measurement point, a roughness curve was measured and a value of Ra was calculated. The average value of those nine values of Ra was defined as the value of Ra of the charging roller. As a result, Ra of the charging roller 1 was found to be 0.69 μm. The evaluation result is shown as "surface roughness" in Table 15-2.

[4-2. Martens Hardness of Surface Layer at Protruded Portion Derived from Resin Particles for Roughness Adjustment]

The Martens hardness of the surface of the surface layer at a protruded portion derived from the resin particles for roughness adjustment was measured using a universal hardness tester. Specifically, an ultra-micro hardness tester (trade name: PICODENTOR HM-500, manufactured by Helmut Fischer) was used.

Conditions for the measurement are shown below. Indenter for measurement: square pyramid indenter (angle: 136°, Berkovich type, Material for indenter: diamond) Measurement environment: temperature: 23° C., relative humidity: 50%

Load rate and unload rate: 1 mN/50 s

In this evaluation, the tip of the indenter is brought into abutment with the protruded portion derived from the resin particles for roughness adjustment on the surface of the member for electrophotography, and a load is applied at the speed described in the above-mentioned conditions. When the load reaches 0.04 mN, the load is kept for the period of time described in the above-mentioned conditions, and then an indentation depth h is determined, followed by the calculation of the Martens hardness from the following equation (2).

$$\text{Martens hardness } HM \text{ (N/mm}^2\text{)}=F\text{(N)/surface area of indenter under test load (mm}^2\text{)} \qquad \text{Equation (2)}$$

$=F/(26.43\times h^2)$←In the case of Berkovich, $3\times 3^{1/2}\times\tan\alpha/\cos\alpha\times h^2$ triangular pyramid h: indentation depth of indenter

[4-3. Average Particle Diameter in Surface Layer of Resin Particles for Roughness Adjustment Causing Protruded Portion on Surface of Surface Layer]

An average particle diameter of resin particles for roughness adjustment causing protruded portion on surface of surface layer was measured by FIB-SEM, specifically, FIB-SEM (trade name: DualBeam SEM Helios600, manufactured by FEI Company). The specific method to measure the average particle diameter of resin particles is described below.

A slice was cut out of a region of 5 mm by 5 mm in x-axis (the longitudinal direction of the electroconductive roller) and y-axis (the tangential direction of the circular section in the cross section of the roller perpendicular to X-axis) of the electroconductive roller by a cutter. The slice was observed from z-axis with voltage at 10 kV and at a magnification of 1,000 using FIB-SEM apparatus. Then, one hundred cross sectional images were taken of the slice at 200 nm intervals in z-axis to a depth of 20 μm from the surface with gallium ion beam having an amount of ion beam of 20 nA. In the each resin particles for roughness adjustment which is observed in the cross sectional images, a maxim diameter of resin particles was defined as a diameter of the resin particle. The average diameter of twenty resin particles was defined as the average diameter.

It should be noted that this evaluation was performed for electroconductive members according to Examples 29 to 35 and Comparative Example 7 containing resin particles for roughness adjustment in their surface layers. The results are shown in Table 27.

[5. Film Thickness of Surface Layer]

The film thickness of the surface layer was measured by observing cross-sections at a total of nine sites, i.e., three sites in the axial direction of the surface layer by three sites in the circumferential direction with an optical microscope or an electron microscope, and the average value thereof was defined as the "film thickness" of the surface layer. The evaluation result is shown as "film thickness" in Table 15-2.

[6. Volume Resistivity of Surface Layer]

The volume resistivity of the surface layer was measured using an atomic force microscope (AFM) (Q-scope 250: Quesant) in an electroconductive mode. A sheet having a width of 2 mm and a length of 2 mm was cut out of the surface layer of the charging roller using a manipulator. It should be noted that the cutting of the sheet out of the surface layer was performed so that one surface of the sheet included the surface of the surface layer. Next, platinum was deposited from the vapor onto one surface of the sheet (which is the surface attached with the elastic layer) so as to have a thickness of 10 nm. Next, the surface onto which platinum had been deposited from the vapor was connected to a DC power source (6614C: Agilent) 64 and a voltage of 10 V was applied. The free end of a cantilever was brought into contact with the surface layer, and a current image was obtained through the main body of the AFM. Current values at randomly selected 100 sites in the surface were measured, and an average current value was calculated for the ten lowest current values measured. The volume resistivity was calculated based on the average current value, the average film thickness of the sheet, and the contact area of the cantilever. It should be noted that for the average film thickness of the sheet, the average value of values measured at ten sites in a cross-section of the cut-out sheet with an optical microscope or an electron microscope was adopted.

Conditions for the measurement are shown below. The evaluation result is shown as "volume resistivity" in Table 15-2.

[Conditions for Measurement]

Measurement mode: contact

Cantilever: CSC17

Measurement range: 10 nm×10 nm

Scan rate: 4 Hz

Applied voltage: 10 V.

[7. Evaluation of Injection Charge Amount]

An injection charge amount generated when a charging roller was driven to rotate by a photosensitive member was evaluated as described below. The charging roller 1 was incorporated into a process cartridge (trade name: "HP 36A (CB436A)", manufactured by HP), and a surface potential gauge probe (trade name: MODEL555P-1, manufactured by Trek Japan KK) was placed at a position rotated by 90° from the position of the charging roller 1 in the circumferential direction of the photosensitive member, the position being away from the photosensitive member by 2 mm. The process cartridge was inserted into a laser beam printer (trade name: HP LaserJet P1505 Printer, manufactured by HP), and the surface potential (charge amount) of the central portion of the photosensitive member was measured under the following conditions: the rotation speed of the electrophotographic photosensitive member was halved and a voltage of DC-500 V was applied to the charging roller 1 under a high-temperature and high-humidity (temperature: 30° C., relative humidity: 80%) environment. The average value of the waveform in the first rotation of the photosensitive member measured was defined as the "injection charge amount". It should be noted that a target injection charge amount for maintaining output at a stable image density is 50 V or less. The result is shown as "injection charge amount evaluation normal" in Table 15-2.

[8. Evaluation Test for Discharge Characteristic]

A laser beam printer (trade name: HP LaserJet P1505 Printer, manufactured by HP) was prepared as an electrophotographic apparatus. The laser beam printer can output A4-size paper in a longitudinal direction. In addition, the laser printer has a print speed of 23 sheets/min and an image resolution of 600 dpi. A charging roller included with a process cartridge for the laser beam printer (trade name: "HP 36A (CB436A)", manufactured by HP) was removed, and the charging roller 1 was incorporated in place of the removed charging roller. Then, the process cartridge was mounted onto the laser beam printer. The laser beam printer was used to form an image in which an alphabetical letter "E" having a size of 4 points was printed at a print percentage of 1% on 2,000 sheets of A4-size paper under a low-temperature and low-humidity (temperature: 15° C., relative humidity: 10%) environment. It should be noted that the formation of the electrophotographic image was performed in the so-called intermittent mode involving stopping the rotation of the electrophotographic photosensitive member over 7 seconds every time the image was output on one sheet. As compared to the case of continuously forming electrophotographic images, the image output in the intermittent mode has a larger number of times of sliding between the charging roller and the electrophotographic photosensitive member, and hence can be said to be a more severe evaluation condition for the charging roller. After the completion of such image output on 2,000 sheets, a halftone image (image in which horizontal lines each having a width of 1 dot were drawn at an interval of 2 dots in a direction perpendicular to the rotation direction of the photosensitive member) was output, and the resultant image was evaluated by the following criteria. The evaluation result is shown in Table 15-2.

A: No white spot is found by visual observation on the output image.

B: A white spot is slightly found on the output image.

C: White spots are found across the entirety of the output image.

[9. Evaluation of Wear of Photosensitive Member]

The charging roller 1 was incorporated into a process cartridge (trade name: "HP 36A (CB436A)", manufactured by HP), and the process cartridge was mounted onto a laser beam printer (trade name: HP LaserJet P1505 Printer, manufactured by HP). The laser beam printer was used to form an image in which horizontal lines each having a width of 2 dots were drawn at an interval of 118 spaces in a direction perpendicular to the rotation direction of the electrophotographic photosensitive member on 2,000 sheets of A4-size paper under a low-temperature and low-humidity (temperature: 15° C., relative humidity: 10%) environment. It should be noted that the formation of the electrophotographic image was performed in the so-called intermittent mode involving stopping the rotation of the electrophotographic photosensitive member over 10 seconds every time the image was output on one sheet. As compared to the case of continuously forming electrophotographic images, the image output in the intermittent mode has a larger number of times of sliding between the charging roller and the electrophotographic photosensitive member, and hence is a more severe evaluation condition for the wear of the photosensitive member.

After the image formation on 2,000 sheets, vertical line-like image unevenness on a halftone image (image in which horizontal lines each having a width of 1 dot were drawn at an interval of 2 dots in a direction perpendicular to the rotation direction of the photosensitive member) due to non-uniformity of the wear was evaluated by visual observation to perform image evaluation. The evaluation result is shown as "wear of photosensitive member" in Table 15-2.

Rank 1: Vertical line-like image unevenness does not occur.

Rank 2: Vertical line-like image unevenness slightly occurs.

Rank 3: Slight vertical line-like image unevenness occurs at a charging roller pitch, but at a level at which no problem arises in practical use.

[10. Evaluation of Initial Injection Charge Amount (Cleaner-Less)]

A gear was attached to the charging roller 1 so that the charging roller was rotated with a circumferential speed difference of 110% in a forward direction with respect to the rotation of the photosensitive member. The charging roller 1 was incorporated into a process cartridge (trade name: "HP 36A (CB436A)", manufactured by HP) from which a charging roller and a cleaning blade included therewith had been removed. The process cartridge was mounted onto a laser beam printer (trade name: HP LaserJet P1505 Printer, manufactured by HP) and an initial injection charge amount was evaluated in the same manner as in the case of "7. Evaluation of Injection Charge Amount" described above. It should be noted that a target injection charge amount for maintaining output at a stable image density is 50 V or less. The result is shown as "initial injection charge amount evaluation (cleaner-less)" in Table 15-2.

[11. Injection Charge Amount Evaluation after Endurance (Cleaner-Less)]

In the same manner as in the case of "10. Evaluation of Initial Injection Charge Amount (Cleaner-less)" described above, a laser beam printer was prepared. The laser beam printer was used to form an image in which an alphabetical letter "E" having a size of 4 points was printed at a print percentage of 1% on 2,000 sheets of A4-size paper under a high-temperature and high-humidity (temperature: 30° C., relative humidity: 80%) environment. It should be noted that the formation of the electrophotographic image was performed in the so-called intermittent mode involving stopping the rotation of the electrophotographic photosensitive member over 7 seconds every time the image was output on one sheet. As compared to the case of continuously forming electrophotographic images, the image output in the intermittent mode has a larger number of times of sliding between the charging roller and the electrophotographic photosensitive member, and hence can be said to be a more severe evaluation condition for the charging roller. After the completion of such image output on 2,000 sheets, injection charge amount evaluation after endurance (cleaner-less) was performed in the same manner as in the case of "7. Evaluation of Injection Charge Amount" described above. It should be noted that a target injection charge amount for maintaining output at a stable image density is 50 V or less. The result is shown as "injection charge amount evaluation after endurance (cleaner-less)" in Table 15-2.

Examples 2 to 37

Charging rollers 2 to 37 were produced in the same manner as in Example 1 except for changing the coating liquid G-1 for surface layer formation to the coating liquids for surface layer formation (G-2 to G-35) shown in Table 15-1 in Examples 2 to 35, and then various measurements and evaluations were performed in the same manner as in Example 1. The results are shown in Table 15-2.

It should be noted that in each of Examples 29 to 35, in which the resin particles for roughness adjustment were added into the coating liquid for surface layer formation, in addition to the above-mentioned evaluations, the Martens hardness (surface hardness 2) of the surface layer at a protruded portion of the surface was measured as described below.

[12. Measurement of Martens Hardness of Surface Layer]

The Martens hardness of the surface layer of the charging roller at the protruded portion of the surface was measured using a universal hardness tester (trade name: PICODENTOR HM-500, manufactured by Fischer Instruments K.K.). Specifically, the tip of a Vickers indenter made of diamond having a square pyramid shape was adjusted to abut with the center of the protruded portion derived from the resin particles for roughness adjustment of the surface layer. Then, the indenter was driven into the surface layer, and a Martens hardness (N=0.04 mN) when the load reached 0.04 mN was measured. Randomly selected ten sites were used as measurement points, and the average value of the ten measurements was adopted. The speed at which the indenter was driven into the surface layer was based on the following conditional equation (2). It should be noted that in the equation (2), F represents force and t represents time.

$$dF/dt = 1\ \text{mN}/50\ \text{s} \qquad (2)$$

The measurement result is shown as "surface hardness 2" in Table 15-2.

Example 38

A surface layer having a film thickness of 21 μm was formed on an elastic layer in the same manner as in Example 1. The resultant was irradiated with UV light having a wavelength of 254 nm so as to achieve an integrated light quantity of 9,000 $mJ/cm^2$. Thus, a charging roller 38 was produced. The irradiation with UV light was performed using a low-pressure mercury lamp (manufactured by Harison Toshiba Lighting Corporation). The elastic layer including the surface layer was cut out of the resultant charging roller, platinum was deposited from the vapor onto the outermost surface of the surface layer, and a region of 2.0 μm by 2.0 μm was observed and photographed at a magnification of 40,000 using a scanning electron microscope (trade name: S-4800, manufactured by Hitachi High-Technologies Corporation). As a result, the exposure of the electroconductive fine particles was confirmed. The charging roller was evaluated in the same manner as in Example 1. The results are shown in Table 15-2.

Examples 39 to 41

Charging rollers 39 to 41 were produced in the same manner as in Example 1 except for changing the elastic roller 1 to the elastic rollers shown in Table 15-1, and then evaluations were performed in the same manner as in Example 1. The results are shown in Table 15-2.

TABLE 15-1

| Example | Elastic roller | Coating liquid for surface layer formation No. | Group A: $R_{11}$ | Group A: $R_{12}$ | Group A: p, q | Group B | Group B | Group B | Group B | Group C: $R_{41}$ | Group C: k |
|---|---|---|---|---|---|---|---|---|---|---|---|
| 1 | 1 | G-1 | $(CH_2)_5$ | $(CH_2)_6$ | p, q = 6.9 | Structural formula (2) | | | r = 9.1, s = 5.5 | — | |
| 2 | 1 | G-2 | $(CH_2)_4$ | $(CH_2)_6$ | p = 10.7 q = 4.6 | Structural formula (2) | | | r = 9.1, s = 5.5 | — | |
| 3 | 1 | G-3 | $(CH_2)_3$ | $(CH_2)_4$ | p, q = 8.8 | Structural formula (2) | | | r = 9.1, s = 5.5 | — | |
| 4 | 1 | G-4 | $(CH_2)_4$ | $(CH_2)_6$ | p = 14.5 q = 1.6 | Structural formula (2) | | | r = 9.1, s = 5.5 | — | |
| 5 | 1 | G-5 | $(CH_2)_6$ | $(CH_2)_2$—CHMe—$(CH_2)_2$ | p, q = 6.5 | Structural formula (2) | | | r = 9.1, s = 5.5 | — | |
| 6 | 1 | G-6 | $(CH_2)_6$ | $(CH_2)_2$—CHMe—$(CH_2)_2$ | p = 1.3 q = 11.8 | Structural formula (2) | | | r = 9.1, s = 5.5 | — | |
| 7 | 1 | G-7 | $(CH_2)_6$ | $(CH_2)_2$—CHMe—$(CH_2)_2$ | p = 2.0 q = 18.0 | Structural formula (2) | | | r = 9.1, s = 5.5 | — | |
| 8 | 1 | G-8 | $(CH_2)_9$ | $CH_2$—CHMe—$(CH_2)_6$ | p = 6.5 q = 3.5 | Structural formula (2) | | | r = 9.1, s = 5.5 | — | |
| 9 | 1 | G-9 | $(CH_2)_9$ | $CH_2$—CHMe—$(CH_2)_6$ | p = 3.5 q = 6.5 | Structural formula (2) | | | r = 9.1, s = 5.5 | — | |
| 10 | 1 | G-10 | $(CH_2)_6$ | $CH_2$—CH< $(CH_2)_2$ / $(CH_2)_2$ >CH—$CH_2$ | p, q = 2.7 | Structural formula (2) | | | r = 9.1, s = 5.5 | — | |
| 11 | 1 | G-11 | $(CH_2)_6$ | $CH_2$—CH< $(CH_2)_2$ / $(CH_2)_2$ >CH—$CH_2$ | p = 4.1 q = 1.4 | Structural formula (2) | | | r = 9.1, s = 5.5 | — | |
| 12 | 1 | G-12 | — | — | — | Structural formula (3) | $R_{31}(CH_2)_3$ | $R_{32}(CH_2)_4$ | m = 12 n = 5.1 | $(CH_2)_6$ | k = 13.2 |
| 13 | 1 | G-13 | — | — | — | Structural formula (3) | $R_{31}(CH_2)_6$ | $R_{32}(CH_2)_8$ | m = 2.7 n = 6.3 | $(CH_2)_6$ | k = 13.2 |
| 14 | 1 | G-14 | $(CH_2)_5$ | $(CH_2)_6$ | p, q = 6.9 | — | | | — | $(CH_2)_6$ | k = 13.2 |
| 15 | 1 | G-15 | $(CH_2)_3$ | $(CH_2)_4$ | p, q = 8.8 | — | | | — | $(CH_2)_6$ | k = 13.2 |
| 16 | 1 | G-16 | $(CH_2)_6$ | $(CH_2)_2$—CHMe—$(CH_2)_2$ | p, q = 6.5 | — | | | — | $(CH_2)_6$ | k = 13.2 |
| 17 | 1 | G-17 | $(CH_2)_6$ | $(CH_2)_2$—CHMe—$(CH_2)_2$ | p = 2.0 q = 18.0 | — | | | — | $(CH_2)_6$ | k = 13.2 |
| 18 | 1 | G-18 | $(CH_2)_6$ | $CH_2$—CH< $(CH_2)_2$ / $(CH_2)_2$ >CH—$CH_2$ | p = 4.1 q = 1.4 | — | | | — | $(CH_2)_6$ | k = 13.2 |
| 19 | 1 | G-19 | $(CH_2)_5$ | $(CH_2)_6$ | p, q = 6.9 | — | | | — | $(CH_2)_6$ | k = 20.1 |
| 20 | 1 | G-20 | $(CH_2)_6$ | $(CH_2)_2$—CHMe—$(CH_2)_2$ | p = 2.0 q = 18.0 | — | | | — | $CH_2$—CH< $(CH_2)_2$ / $(CH_2)_2$ >CH—$CH_2$ | k = 5.8 |
| 21 | 1 | G-21 | $(CH_2)_9$ | $CH_2$—CHMe—$(CH_2)_6$ | p = 3.5 q = 6.5 | — | | | — | $CH_2$—CEtBu—$CH_2$ | k = 4.6 |
| 22 | 1 | G-22 | — | — | — | Structural formula (2) | | | r = 9.1, s = 5.5 | $(CH_2)_6$ | k = 13.2 |
| 23 | 1 | G-23 | — | — | — | Structural formula (2) | | | r = 9.1, s = 5.5 | $CH_2$—CH< $(CH_2)_2$ / $(CH_2)_2$ >CH—$CH_2$ | k = 5.8 |

TABLE 15-1-continued

| Exam- ple | Elastic roller | Coating liquid for surface layer formation No. | Structure contained in surface layer | | | | | | |
|---|---|---|---|---|---|---|---|---|---|
| | | | Group A | | | Group B | | Group C | |
| | | | $R_{11}$ | $R_{12}$ | p, q | | | $R_{41}$ | k |
| 24 | 1 | G-24 | — | 0 | — | Structural formula (2) | r = 9.1, s = 5.5 | $CH_2$—CEtBu—$CH_2$ | k = 4.6 |
| 25 | 1 | G-25 | $(CH_2)_5$ | $(CH_2)_6$ | p, q = 6.9 | Structural formula (2) | r = 9.1, s = 5.5 | $(CH_2)_6$ | k = 13.2 |
| 26 | 1 | G-26 | $(CH_2)_5$ | $(CH_2)_6$ | p, q = 6.9 | Structural formula (2) | r = 9.1, s = 5.5 | — | |
| 27 | 1 | G-27 | $(CH_2)_5$ | $(CH_2)_6$ | p, q = 6.9 | Structural formula (2) | r = 9.1, s = 5.5 | — | |
| 28 | 1 | G-28 | $(CH_2)_5$ | $(CH_2)_6$ | p, q = 6.9 | Structural formula (2) | r = 9.1, s = 5.5 | — | |
| 29 | 1 | G-29 | $(CH_2)_5$ | $(CH_2)_6$ | p, q = 6.9 | Structural formula (2) | r = 9.1, s = 5.5 | — | |
| 30 | 1 | G-30 | $(CH_2)_5$ | $(CH_2)_6$ | p, q = 6.9 | Structural formula (2) | r = 9.1, s = 5.5 | — | |
| 31 | 1 | G-31 | $(CH_2)_5$ | $(CH_2)_6$ | p, q = 6.9 | Structural formula (2) | r = 9.1, s = 5.5 | — | |
| 32 | 1 | G-32 | $(CH_2)_5$ | $(CH_2)_6$ | p, q = 6.9 | Structural formula (2) | r = 9.1, s = 5.5 | — | |
| 33 | 1 | G-33 | $(CH_2)_5$ | $(CH_2)_6$ | p, q = 6.9 | Structural formula (2) | r = 9.1, s = 5.5 | — | |
| 34 | 1 | G-34 | $(CH_2)_5$ | $(CH_2)_6$ | p, q = 6.9 | Structural formula (2) | r = 9.1, s = 5.5 | — | |
| 35 | 1 | G-35 | $(CH_2)_5$ | $(CH_2)_6$ | p, q = 6.9 | Structural formula (2) | r = 9.1, s = 5.5 | — | |
| 36 | 1 | G-1 | $(CH_2)_5$ | $(CH_2)_6$ | p, q = 6.9 | Structural formula (2) | r = 9.1, s = 5.5 | — | |
| 37 | 1 | G-1 | $(CH_2)_5$ | $(CH_2)_6$ | p, q = 6.9 | Structural formula (2) | r = 9.1, s = 5.5 | — | |
| 38 | 1 | G-1 | $(CH_2)_5$ | $(CH_2)_6$ | p, q = 6.9 | Structural formula (2) | r = 9.1, s = 5.5 | — | |
| 39 | 2 | G-1 | $(CH_2)_5$ | $(CH_2)_6$ | p, q = 6.9 | Structural formula (2) | r = 9.1, s = 5.5 | — | |
| 40 | 3 | G-1 | $(CH_2)_5$ | $(CH_2)_6$ | p, q = 6.9 | Structural formula (2) | r = 9.1, s = 5.5 | — | |
| 41 | 4 | G-1 | $(CH_2)_5$ | $(CH_2)_6$ | p, q = 6.9 | Structural formula (2) | r = 9.1, s = 5.5 | — | |

TABLE 15-2

| Example | Elastic roller | Coating liquid for surface layer formation No. | Silicone additive | Resin particles for roughness adjustment Kind | Resin particles for roughness adjustment Parts by mass | Film thickness (μm) | UV treatment | Surface hardness (N/mm$^2$) 1 | Surface hardness (N/mm$^2$) 2 | Surface roughness (μm) | Volume resistivity (Ω · cm) | Discharge characteristic evaluation | Wear of photosensitive member | Injection charge amount evaluation Normal | Injection charge amount evaluation Cleanerless Initial | Injection charge amount evaluation Cleanerless After endurance |
|---|---|---|---|---|---|---|---|---|---|---|---|---|---|---|---|---|
| 1 | 1 | G-1 | — | — | — | 21 | — | 2.3 | — | 0.69 | 6.4E+10 | A | 1 | 8 | 35 | 45 |
| 2 | 1 | G-2 | — | — | — | 20 | — | 2.2 | — | 0.7 | 9.9E+10 | A | 1 | 7 | 34 | 43 |
| 3 | 1 | G-3 | — | — | — | 22 | — | 3.0 | — | 0.66 | 2.5E+11 | A | 1 | 9 | 33 | 47 |
| 4 | 1 | G-4 | — | — | — | 20 | — | 2.8 | — | 0.68 | 4.2E+10 | A | 1 | 8 | 37 | 44 |
| 5 | 1 | G-5 | — | — | — | 21 | — | 2.4 | — | 0.67 | 2.8E+10 | A | 1 | 9 | 38 | 48 |
| 6 | 1 | G-6 | — | — | — | 23 | — | 2.3 | — | 0.68 | 2.7E+10 | A | 1 | 9 | 36 | 46 |
| 7 | 1 | G-7 | — | — | — | 20 | — | 2.1 | — | 0.73 | 1.2E+11 | A | 1 | 7 | 34 | 45 |
| 8 | 1 | G-8 | — | — | — | 21 | — | 2.2 | — | 0.72 | 2.2E+10 | A | 1 | 9 | 38 | 48 |
| 9 | 1 | G-9 | — | — | — | 22 | — | 2.2 | — | 0.67 | 4.7E+10 | A | 1 | 8 | 37 | 44 |
| 10 | 1 | G-10 | — | — | — | 21 | — | 6 | — | 0.68 | 6.5E+11 | A | 2 | 7 | 32 | 43 |
| 11 | 1 | G-11 | — | — | — | 20 | — | 6.5 | — | 0.69 | 7.0E+11 | A | 2 | 6 | 32 | 42 |
| 12 | 1 | G-12 | — | — | — | 20 | — | 2.3 | — | 0.7 | 5.5E+11 | A | 1 | 7 | 32 | 46 |
| 13 | 1 | G-13 | — | — | — | 19 | — | 2.4 | — | 0.73 | 1.2E+10 | A | 1 | 9 | 38 | 48 |
| 14 | 1 | G-14 | — | — | — | 20 | — | 2.3 | — | 0.68 | 7.0E+11 | A | 1 | 6 | 34 | 49 |
| 15 | 1 | G-15 | — | — | — | 22 | — | 3.1 | — | 0.67 | 5.0E+11 | A | 1 | 6 | 33 | 49 |
| 16 | 1 | G-16 | — | — | — | 21 | — | 2.4 | — | 0.67 | 1.8E+11 | A | 1 | 7 | 35 | 48 |
| 17 | 1 | G-17 | — | — | — | 20 | — | 2.3 | — | 0.68 | 4.5E+11 | A | 1 | 7 | 34 | 48 |
| 18 | 1 | G-18 | — | — | — | 23 | — | 6.6 | — | 0.67 | 8.5E+11 | A | 2 | 7 | 34 | 49 |
| 19 | 1 | G-19 | — | — | — | 21 | — | 2.2 | — | 0.68 | 5.3E+11 | A | 1 | 7 | 34 | 49 |
| 20 | 1 | G-20 | — | — | — | 20 | — | 6.1 | — | 0.69 | 7.3E+11 | A | 2 | 6 | 33 | 48 |
| 21 | 1 | G-21 | — | — | — | 19 | — | 5.8 | — | 0.73 | 5.0E+10 | A | 2 | 8 | 35 | 48 |
| 22 | 1 | G-22 | — | — | — | 22 | — | 2.4 | — | 0.68 | 5.8E+11 | A | 1 | 6 | 33 | 48 |
| 23 | 1 | G-23 | — | — | — | 20 | — | 6.8 | — | 0.70 | 1.1E+10 | A | 2 | 9 | 36 | 49 |
| 24 | 1 | G-24 | — | — | — | 19 | — | 5.3 | — | 0.71 | 2.4E+11 | A | 2 | 7 | 35 | 48 |
| 25 | 1 | G-25 | — | — | — | 20 | — | 2.5 | — | 0.68 | 8.0E+10 | A | 1 | 7 | 35 | 47 |
| 26 | 1 | G-26 | F-1 | — | — | 21 | — | 2.3 | — | 0.61 | 8.0E+10 | A | 1 | 6 | 35 | 40 |
| 27 | 1 | G-27 | F-2 | — | — | 22 | — | 2.8 | — | 0.63 | 9.9E+10 | A | 1 | 6 | 35 | 41 |
| 28 | 1 | G-28 | F-3 | — | — | 20 | — | 2.5 | — | 0.62 | 1.5E+11 | A | 1 | 6 | 33 | 39 |
| 29 | 1 | G-29 | — | E-1 | 34.8 | 18 | — | 2.5 | 3.2 | 1.984 | 4.9E+10 | A | 1 | 5 | 26 | 35 |
| 30 | 1 | G-30 | — | E-2 | 34.8 | 21 | — | 2.4 | 3.5 | 1.713 | 4.7E+10 | A | 1 | 6 | 28 | 37 |
| 31 | 1 | G-31 | — | E-3 | 34.8 | 20 | — | 2.5 | 3.4 | 2.946 | 4.4E+10 | A | 1 | 4 | 25 | 34 |
| 32 | 1 | G-32 | — | E-4 | 34.8 | 19 | — | 2.4 | 4.1 | 2.727 | 3.2E+10 | A | 1 | 5 | 27 | 35 |
| 33 | 1 | G-33 | — | E-1 | 11.6 | 18 | — | 2.4 | 3.4 | 1.3126 | 6.0E+10 | A | 1 | 6 | 29 | 38 |
| 34 | 1 | G-34 | — | E-1 | 23.2 | 20 | — | 2.5 | 3.3 | 1.6626 | 5.4E+10 | A | 1 | 6 | 28 | 37 |
| 35 | 1 | G-35 | — | E-1 | 46.4 | 20 | — | 2.6 | 3.4 | 2.30 | 4.3E+10 | A | 1 | 5 | 30 | 38 |
| 36 | 1 | G-1 | — | — | — | 11 | — | 2.2 | — | 0.75 | 6.8E+10 | A | 1 | 9 | 38 | 48 |
| 37 | 1 | G-1 | — | — | — | 32 | — | 2.6 | — | 0.66 | 6.9E+10 | A | 1 | 6 | 32 | 41 |
| 38 | 1 | G-1 | — | — | — | 21 | Present | 2.3 | — | 0.68 | 5.9E+10 | A | 1 | 8 | 35 | 40 |
| 39 | 2 | G-1 | — | — | — | 19 | — | 2.3 | — | 0.68 | 6.9E+10 | A | 1 | 9 | 37 | 47 |
| 40 | 3 | G-1 | — | — | — | 21 | — | 2.3 | — | 0.68 | 6.8E+10 | A | 1 | 8 | 36 | 45 |
| 41 | 4 | G-1 | — | — | — | 20 | — | 2.4 | — | 0.69 | 6.9E+10 | B | 1 | 4 | 29 | 31 |

Surface hardness 1: universal hardness at a depth of 1 μm (t = 1 μm position)
Surface hardness 2: Martens hardness when the load reaches 0.04 mN (N = 0.04 mN)

Comparative Example 1

A coating liquid G-36 for surface layer formation was produced in the same manner as in Example 1 except that, under a nitrogen atmosphere, materials shown in Table 16 below were subjected to a reaction by being heated and stirred at a temperature of 90° C. for 3 hours. A charging roller 51 was produced and evaluated in the same manner as in Example 1 except that the coating liquid G-1 for surface layer formation was changed to the coating liquid G-36 for surface layer formation. The results are shown in Table 26.

TABLE 16

| Material | parts by mass |
|---|---|
| Hydroxy group-terminated urethane prepolymer: C-1 | 100 |
| Isocyanate group-terminated prepolymer: D-9 | 54.7 |

TABLE 16-continued

| Material | parts by mass |
|---|---|
| Carbon black (trade name: MA230, manufactured by Mitsubishi Chemical Corporation) | 17 |

Comparative Examples 2 and 3

Coating liquids G-37 and G-38 for surface layer formation were produced by the same method as the coating liquid G-1 for surface layer formation using starting raw materials shown in Table 17. Charging rollers 52 and 53 were produced in the same manner as in Example 1 except for changing the coating liquid G-1 for surface layer formation to the coating liquid G-37 or G-38 for surface layer formation, and were evaluated in the same manner as in Example 1. The results are shown in Table 26.

TABLE 17

| Coating liquid for surface layer formation No. | Hydroxy group-terminated urethane prepolymer No. | Hydroxy group-terminated urethane prepolymer parts by mass | Isocyanate group-terminated prepolymer No. | Isocyanate group-terminated prepolymer parts by mass | Carbon black parts by mass |
|---|---|---|---|---|---|
| G-36 | C-1 | 100.0 | D-9 | 54.7 | 17.0 |
| G-37 | C-10 | 100.0 | D-8 | 54.7 | 17.0 |
| G-38 | C-13 | 100.0 | D-5 | 54.7 | 17.0 |

Comparative Example 4

[1. Synthesis of Hydroxy Group-terminated Urethane Prepolymer C-15]

A hydroxy group-terminated urethane prepolymer C-15 was synthesized in the same manner as in the case of the synthesis of the hydroxy group-terminated urethane prepolymer C-1 except that the materials were changed to those shown in Table 18 below.

TABLE 18

| Material | parts by mass |
|---|---|
| DURANOL T5650E (Mn = 500 manufactured by Asahi Kasei Chemicals Corporation) | 100 |
| Raw material isocyanate B-1 (trade name: Millionate MT manufactured by Nippon Polyurethane Industry Co., Ltd.) | 25 |

[2. Synthesis of Isocyanate Group-Terminated Prepolymer D-10]

An isocyanate group-terminated prepolymer D-10 was synthesized in the same manner as in the case of the synthesis of the isocyanate group-terminated prepolymer D-1 except that the materials were changed to those shown in Table 19 below.

TABLE 19

| Material | parts by mass |
|---|---|
| NIPPOLLAN 983 (Mn = 1,000 manufactured by Nippon Polyurethane Industry Co., Ltd.) | 100 |
| Raw material polyisocyanate B-2 (trade name: Millionate MR200 manufactured by Nippon Polyurethane Industry Co., Ltd.) | 134.6 |

[3. Preparation of Coating Liquid G-39 for Surface Layer Formation]

A coating liquid G-39 for surface layer formation was produced in the same manner as in the case of the preparation of the coating liquid G-1 for surface layer formation except that the materials were changed to those shown in Table 20 below.

TABLE 20

| Material | parts by mass |
|---|---|
| Hydroxy group-terminated urethane prepolymer: C-15 | 100 |
| Isocyanate group-terminated prepolymer: D-10 | 54.7 |
| Carbon black (trade name: MA230, manufactured by Mitsubishi Chemical Corporation) | 17 |

[4. Production and Evaluation of Charging Roller]

A charging roller 54 was produced in the same manner as in Example 1 except for changing the coating liquid G-1 for surface layer formation to the coating liquid G-39 for surface layer formation, and was evaluated in the same manner as in Example 1. The results are shown in Table 26.

Comparative Example 5

2 Parts by mass of an additive H-1 shown in Table 21 below was added to the coating liquid G-1 for surface layer formation, and the contents were mixed to produce a coating liquid G-40 for surface layer formation. A charging roller 55 was produced in the same manner as in Example 1 except for changing the coating liquid G-1 for surface layer formation to the coating liquid G-40 for surface layer formation, and was evaluated in the same manner as in Example 1. The results are shown in Table 26.

TABLE 21

| No. | Additive |
|---|---|
| H-1 | 5-Sulfoisophthalic acid dihydroxyethyl ester sodium salt |
| H-2 | N-Methyldiethanolamine |

Comparative Example 6

3 Parts by mass of an additive H-2 was added to the coating liquid G-1 for surface layer formation, and the contents were mixed to produce a coating liquid G-41 for surface layer formation. A charging roller 56 was produced in the same manner as in Example 1 except for changing the coating liquid G-1 for surface layer formation to the coating liquid G-41 for surface layer formation, and was evaluated in the same manner as in Example 1. The results are shown in Table 26.

Comparative Example 7

A coating liquid G-42 for surface layer formation was produced in the same manner as the coating liquid G-26 for surface layer formation except that 34.8 parts by mass of resin particles E-5 for roughness adjustment was added to the coating liquid G-1 for surface layer formation. A charging roller 57 was produced in the same manner as in Example 1 except for changing the coating liquid G-1 for surface layer formation to the coating liquid G-42 for surface layer formation, and was evaluated in the same manner as in Example 1. The results are shown in Table 26.

Comparative Example 8

[1. Synthesis of Isocyanate Group-Terminated Prepolymer D-11]

An isocyanate group-terminated prepolymer D-11 was synthesized in the same manner as the isocyanate group-terminated prepolymer D-1 except that the materials were changed to those shown in Table 22 below.

TABLE 22

| Material | parts by mass |
|---|---|
| Polypropylene glycol-based polyol (trade name: EXCENOL 1030 manufactured by Asahi Glass Co., Ltd.) | 100 |
| Millionate MT manufactured by Nippon Polyurethane Industry Co., Ltd. | 38.4 |

[2. Preparation of Coating Liquid G-43 for Surface Layer Formation]

A coating liquid G-43 for surface layer formation was produced in the same manner as in the case of the coating liquid G-1 for surface layer formation except that the materials were changed to those shown in Table 23 below.

TABLE 23

| Material | parts by mass |
|---|---|
| Polypropylene glycol-based polyol (trade name: EXCENOL 3020 manufactured by Asahi Glass Co., Ltd.) | 100 |
| Isocyanate group-terminated prepolymer: D-11 | 82.5 |
| Carbon black (trade name: MA230, manufactured by Mitsubishi Chemical Corporation) | 34.9 |

[3. Production and Evaluation of Charging Roller]

A charging roller 58 was produced in the same manner as in Example 1 except for changing the coating liquid G-1 for surface layer formation to the coating liquid G-43 for surface layer formation, and was evaluated in the same manner as in Example 1. The results are shown in Table 26.

Comparative Example 9

[1. Synthesis of Isocyanate Group-Terminated Prepolymer D-12]

An isocyanate group-terminated prepolymer D-12 was synthesized in the same manner as the isocyanate group-terminated prepolymer D-1 except that the materials were changed to those shown in Table 24 below.

TABLE 24

| Material | parts by mass |
|---|---|
| Polycaprolactone-based polyol (trade name: PLACCEL 220N manufactured by Daicel Chemical Industries, Ltd.) | 100 |
| Millionate MT manufactured by Nippon Polyurethane Industry Co., Ltd. | 33.5 |

[2. Preparation of Coating Liquid G-44 for Surface Layer Formation]

A coating liquid G-44 for surface layer formation was produced in the same manner as in the case of the coating liquid G-1 for surface layer formation except that the materials were changed to those shown in Table 25 below.

TABLE 25

| Material | parts by mass |
|---|---|
| Polycaprolactone-based polyol (trade name: PLACCEL 220N manufactured by Daicel Chemical Industries, Ltd.) | 100 |
| Isocyanate group-terminated prepolymer: D-12 | 54.7 |
| Carbon black (trade name: MA230, manufactured by Mitsubishi Chemical Corporation) | 17 |

[3. Production and Evaluation of Charging Roller]

A charging roller 59 was produced in the same manner as in Example 1 except for changing the coating liquid G-1 for surface layer formation to the coating liquid G-44 for surface layer formation, and was evaluated in the same manner as in Example 1. The results are shown in Table 26.

TABLE 26

| | | | Structure contained in surface layer | | | | | | | | | Resin particles for roughness adjustment | |
|---|---|---|---|---|---|---|---|---|---|---|---|---|---|
| Comparative Example | Elastic roller | Coating liquid for surface layer formation No. | Group A | | | Group B | Group C | | Polyether | Polyester | Additive (phr) | | |
| | | | $R_{11}$ | $R_{12}$ | p, q | r, s | $R_{41}$ | k | | | | Kind | Parts by mass |
| 1 | 1 | G-36 | $(CH_2)_5$ | $(CH_2)_6$ | p, q = 6.9 | — | — | — | — | — | — | — | — |
| 2 | 1 | G-37 | | — | | r = 9.1, s = 5.5 | — | — | — | — | — | — | — |
| 3 | 1 | G-38 | | — | | — | $(CH_2)_6$ | 13.2 | — | — | — | — | — |
| 4 | 1 | G-39 | $(CH_2)_5$ | $(CH_2)_6$ | p, q = 1.5 | r = 4.6, s = 2.7 | — | — | — | — | — | — | — |
| 5 | 1 | G-40 | $(CH_2)_5$ | $(CH_2)_6$ | p, q = 6.9 | r = 9.1, s = 5.5 | — | — | — | — | H-1 | — | — |
| 6 | 1 | G-41 | $(CH_2)_5$ | $(CH_2)_6$ | p, q = 6.9 | r = 9.1, s = 5.5 | — | — | — | — | H-2 | — | — |
| 7 | 1 | G-42 | $(CH_2)_5$ | $(CH_2)_6$ | p, q = 6.9 | — | — | — | — | — | — | E-5 | 34.8 |
| 8 | 1 | G-43 | | — | | — | — | — | PPG | — | — | — | — |
| 9 | 1 | G-44 | | — | | — | — | — | — | Cp | — | — | — |

TABLE 26-continued

| Comparative Example | Film thickness (μm) | Surface hardness (N/mm2) 1 | Surface hardness (N/mm2) 2 | Surface roughness (μm) | Volume resistivity (Ω · cm) | Discharge characteristic evaluation | Wear of photosensitive member | Injection charge amount evaluation: Normal | Injection charge amount evaluation: Cleaner-less Initial | Injection charge amount evaluation: Cleaner-less After endurance |
|---|---|---|---|---|---|---|---|---|---|---|
| 1 | 20 | 2.2 | — | 0.70 | 9.7E+10 | C | 1 | 8 | 33 | 52 |
| 2 | 20 | 2.3 | — | 0.69 | 9.2E+09 | A | 1 | 20 | 46 | 56 |
| 3 | 20 | 7.1 | — | 0.68 | 9.8E+11 | A | 3 | 7 | 34 | 44 |
| 4 | 20 | 7.5 | — | 0.71 | 5.70E+11 | B | 3 | 8 | 34 | 44 |
| 5 | 20 | 4.5 | — | 0.69 | 1.50E+08 | A | 3 | 25 | 56 | 64 |
| 6 | 20 | 4.3 | — | 0.67 | 4.70E+09 | A | 3 | 23 | 52 | 61 |
| 7 | 20 | 8.2 | 12 | 2.46 | 6.4E+10 | A | 3 | 4 | 33 | 42 |
| 8 | 20 | | — | 0.67 | 3.20E+08 | A | 1 | 63 | 89 | 110 |
| 9 | 20 | | — | 0.68 | 1.30E+09 | A | 1 | 55 | 74 | 97 |

Cp: polyester obtained by subjecting ϵ-caprolactone to ring-opening polymerization
Surface hardness 1: universal hardness at a depth of 1 μm (t = 1 μm position)
Surface hardness 2: Martens hardness when the load reaches 0.04 mN (N = 0.04 mN)

TABLE 27

| | Average particle diameter of resin particles causing protruded portion on surface layer (μm) |
|---|---|
| Example 29 | 8.8 |
| Example 30 | 7.1 |
| Example 31 | 15.3 |
| Example 32 | 9.7 |
| Example 33 | 9.2 |
| Example 34 | 8.8 |
| Example 35 | 9.1 |
| Comparative Example 7 | 7.8 |

In each of Examples 1 to 41, satisfactory or substantially satisfactory results are exhibited in all of the evaluation of the discharge characteristic and the evaluation of the wear of the photosensitive member, the evaluation of the injection charge amount in the normal system and the evaluation of the injection charge amount in the cleaner-less system. Particularly in each of Examples 1 to 13, the surface layer contains structures of Group A and Group B, and hence the change in injection charge amount evaluation in the cleaner-less system is small between the initial injection charge amount and the injection charge amount after endurance. In addition, in each of Examples 26 to 35, in which the silicone additive or the resin particles for roughness adjustment are added to the surface layer of Example 1, the change in injection charge amount evaluation in the cleaner-less system is small between the initial injection charge amount and the injection charge amount after endurance. The reason for this is probably as described below. In the case of the silicone additive, in addition to the increase in resistance of the surface layer, improved slidability reduced the wear of the surface layer. In the case of the addition of the resin particles for roughness adjustment, roughness occurred in the surface layer to reduce the contact area with the photosensitive member, consequently reducing the injection charge amount, and moreover, friction was also reduced by the reduction in contact area, which reduced the wear of the surface layer.

On the other hand, in each of Comparative Examples 1 to 9, poor results are exhibited in any one or more of the evaluation of the discharge characteristic, the evaluation of the wear of the photosensitive member, the evaluation of the injection charge amount in the normal system and the evaluation of the injection charge amount in the cleaner-less system. In Comparative Example 1, only a structure of Group A is contained in the polymer having a urethane linkage, and hence tack occurs in the surface layer to reduce the discharge characteristic by the contamination of the surface layer with toner, an external additive, paper dust, or the like through endurance. In addition, in the injection charge amount evaluation in the cleaner-less system, the surface layer is worn, resulting in an injection charge amount after endurance of more than 50 V. In Comparative Example 2, only a structure of Group B is contained in the polymer having a urethane linkage, and hence the volume resistivity of the surface layer is reduced and in the injection charge amount evaluation in the cleaner-less system, the surface layer is worn, resulting in an injection charge amount after endurance of more than 50 V. In Comparative Example 3, only a crystalline structure of Group C is contained in the polymer having a urethane linkage, and hence the low-temperature characteristics are poor and an image defect due to the abrasion of the photosensitive member under a low-temperature and low-humidity environment occurs. In Comparative Example 4, the hardness of the surface layer is high, and hence an image defect due to the abrasion of the photosensitive member under a low-temperature and low-humidity environment occurs. In each of Comparative Examples 5 and 6, the surface layer contains a large amount of sulfonate groups or tertiary amino groups, and hence the volume resistivity is reduced, resulting in an injection charge amount of more than 50 V. In Comparative Example 7, a large amount of hard particles for roughness adjustment is added, and hence the hardness of the surface layer is increased, with the result that an image defect due to drum abrasion occurs. In each of Comparative Examples 8 and 9, the volume resistivity of the surface layer is low, resulting in an injection charge amount of more than 50 V.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242470, filed Nov. 28, 2014, which is hereby incorporated by reference herein in its entirety.

What is claimed is:

1. An electroconductive member for electrophotography comprising, in this order:

an electroconductive substrate;

an electroconductive elastic layer; and a surface layer, wherein the surface layer has a volume resistivity of $1.0\times10^{10}$ to $1.0\times10^{16}$ Ω·cm, the surface layer has a universal hardness of 1.0 to 7.0 $N/mm^2$ at a depth of 1 μm from a surface thereof, and the surface layer contains a polymer having a urethane linkage, a molecule of the polymer having structures represented by structural formulae (1) and (2):

formula (1)

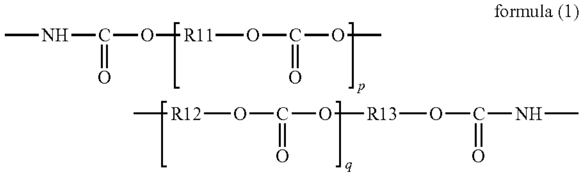

formula (2)

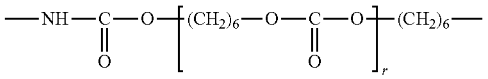

-continued

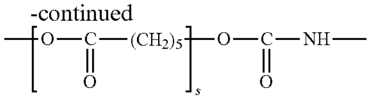

where in formula (1), R11, R12, and R13 each represent a divalent hydrocarbon group having 3 to 9 carbon atoms, provided that R11 and R12 are different from each other, R13 is identical to one of R11 and R12, and p and q each independently represent a number of 1.0 or more; and in formula (2), r and s each independently represent a number of 1.0 or more.

2. An electroconductive member for electrophotography according to claim 1, wherein the surface layer contains particles having a number average particle diameter of 3 to 30 μm, has a protruded portion derived from the particles on the surface thereof, and has a Martens hardness at the protruded portion of 10.0 $N/mm^2$ or less when a load reaches 0.04 mN.

3. An electroconductive member for electrophotography according to claim 1, wherein the surface layer contains electroconductive fine particles having a number average particle diameter of 10 to 100 nm, and part of the electroconductive fine particles are exposed at the surface of the surface layer.

4. A process cartridge, comprising:

an electrophotographic photosensitive member; and a charging member arranged in contact with the electrophotographic photosensitive member, the process cartridge being removably mounted onto a main body of an electrophotographic image-forming apparatus, the charging member being an electroconductive member for electrophotography and comprising, in this order:

an electroconductive substrate;

an electroconductive elastic layer; and a surface layer, wherein the surface layer has a volume resistivity of $1.0\times10^{10}$ to $1.0\times10^{16}$ Ω·cm, the surface layer has a universal hardness of 1.0 to 7.0 $N/mm^2$ at a depth of 1 μm from a surface thereof, and the surface layer contains a polymer having a urethane linkage, a molecule of the polymer having structures represented by formulae (1) and (2):

formula (1)

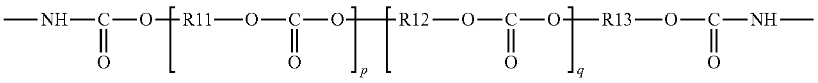

formula (2)

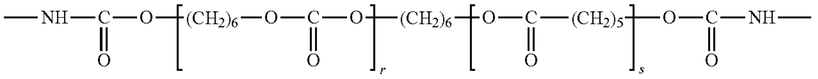

where in formula (1), R11, R12, and R13 each represent a divalent hydrocarbon group having 3 to 9 carbon atoms, provided that R11 and R12 are different from each other, R13 is identical to one of R11 and R12, and p and q each independently represent a number of 1.0 or more; and in formula (2), r and s each independently represent a number of 1.0 or more.

5. An electrophotographic image-forming apparatus, comprising:

an electrophotographic photosensitive member; and a charging member arranged in contact with the electrophotographic photosensitive member, the charging member being an electroconductive member for electrophotography and comprising, in this order:

an electroconductive substrate;

an electroconductive elastic layer; and a surface layer, wherein the surface layer has a volume resistivity of $1.0\times10^{10}$ to $1.0\times10^{16}$ Ω·cm, the surface layer has a universal hardness of 1.0 to 7.0 $N/mm^2$ at a depth of 1 μm from a surface thereof, and the surface layer contains a polymer having a urethane linkage, a molecule of the polymer having structures represented by structural formulae (1) and (2):

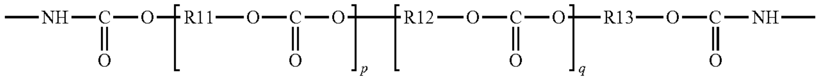

formula (1)

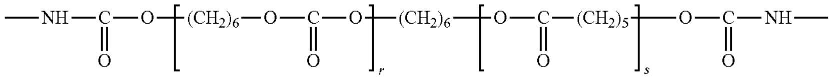

formula (2)

where in formula (1), R11, R12, and R13 each represent a divalent hydrocarbon group having 3 to 9 carbon atoms, provided that R11 and R12 are different from each other, R13 is identical to one of R11 and R12, and p and q each independently represent a number of 1.0 or more; and in formula (2), r and s each independently represent a number of 1.0 or more.

6. An electrophotographic image-forming apparatus according to claim 5, wherein the charging member is configured to move at a different speed from that of the electrophotographic photosensitive member.

* * * * *